United States Patent
Su et al.

(10) Patent No.: US 6,292,791 B1
(45) Date of Patent: Sep. 18, 2001

(54) METHOD AND APPARATUS OF SYNTHESIZING PLUCKED STRING INSTRUMENTS USING RECURRENT NEURAL NETWORKS

(75) Inventors: Wen-yu Su, Chang-Hwa; Sheng-fu Liang, Tainan; Tien-Ho Chung, Hsin-Tien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/097,739

(22) Filed: Jun. 16, 1998

Related U.S. Application Data

(60) Provisional application No. 60/076,260, filed on Feb. 27, 1998.

(51) Int. Cl.[7] ........................................ G06N 3/02
(52) U.S. Cl. ................... 706/23; 706/15; 706/16
(58) Field of Search ............................. 84/601, 603, 604; 706/23

(56) References Cited

U.S. PATENT DOCUMENTS

| | | |
|---|---|---|
| 4,984,276 | 1/1991 | Smith . |
| 5,138,924 | * 8/1992 | Ohya et al. ............................. 84/604 |
| 5,212,334 | 5/1993 | Smith, III . |

(List continued on next page.)

OTHER PUBLICATIONS

Liang, S.F. and Su, Alvin, W.Y, Dynamics Modeling of Musical String by Linear Scattering Recurrent Network, Joint Conference of 1996 International Computer Symposium, Dec. 19–21, ICS '96 Proceedings on Artificial Intelligence, Taiwan, Jan. 1996, pp. 263–270.*

Su, A.W.Y.; Liang San–Fu, Synthesis of plucked–string tones by physical modeling with recurrent neural networks, Multimedia Signal Processing, Jan. 1997., IEEE First Workshop on, 1997, pp.: 71–76.*

Sheng–Fu Liang; Su, A.W.Y.; Chin–Teng Lin, Model–based synthesis of plucked string instruments by using a class of scattering recurrent networks, Neural Networks, IEEE Transactions on, vol.: 11 1, Jan. 2000, pp.: 171–185.*

Bresin, R.; Vedovetto, A., Neural networks for a simpler control of synthesis algorithm of musical tones and for their compression, Time–Frequency and Time–Scale Analysis, Jan. 1994., Proceedings of, the IEEE–SP International Symposium on, 1994, p.: 628.*

Burr, D.J.; Miyata, Y., Hierarchical recurrent networks for learning musical structure, Neural Networks for Processing [1993]III. Proceedings of the, 1993 IEEE–SP Workshop, Jan. 1993, pp.: 216–225.*

(List continued on next page.)

Primary Examiner—Mark Powell
Assistant Examiner—Wilbert Starks
(74) Attorney, Agent, or Firm—Finnegan, Henderson, Farabow, Garrett & Dunner, L.L.P.

(57) ABSTRACT

A "virtual string" is generated for synthesizing sound produced by plucked-string instruments using recurrent neural networks. The disclosed recurrent neural network, called a Scattering Recurrent Network (SRN), is based on the physics of waves traveling in the string. Vibration measured from a plucked string is used as the training data for the SRN. The trained SRN is a virtual model capable of generating tones similar to the tones generated by the physical string. As with a real string, the "virtual string" corresponding to the SRN responds differently to different types of string "plucking" motions.

9 Claims, 27 Drawing Sheets

U.S. PATENT DOCUMENTS

| | | | |
|---|---|---|---|
| 5,308,915 | * | 5/1994 | Ohya et al. ............................. 84/601 |
| 5,448,010 | | 9/1995 | Smith, III . |
| 5,986,199 | * | 8/1992 | Peevers ................................. 84/603 |

OTHER PUBLICATIONS

Helweg, D.A.; Roiblat, H.L.; Nachtigall, P.E., Using a biomimetric neural net to model dolphin echolocation, Artificial Neural Networks and Expert Systems, Jan. 1993. Proceedings., First New Zealand International Two–Stream Conference on, 1993, p.: 247.*

Masri, P.; Canagarajah, N., Synthesis from musical instrument character maps, Audio and Music Technology: The CHallenge of Creative DSP (Ref. No. 1998/470), IEE Colloquium on, Jan. 1998, pp.: 10/1–10/5.*

John W. Gordon; System architectures for computer music; ACM Comput. Surv. 17, 2 (Jun. 1985), pp. 191–233.*

* cited by examiner

STEP
FUNCTION

BIPOLAR RAMP
FUNCTION

BIPOLAR SIGMOID
FUNCTION

FEEDBACK NETWORK

METHOD AND APPARATUS OF SYNTHESIZING PLUCKED STRING INSTRUMENTS USING RECURRENT NEURAL NETWORKS

This application claims the benefit of U.S. Provisional Application No. 60/076,260, filed on Feb. 27, 1998.

FIELD OF THE INVENTION

This invention relates generally to music synthesis by computers, and more specifically, to the synthesis of sounds produced by plucked string instruments.

BACKGROUND OF THE INVENTION

Realistic electronic sound synthesis is becoming increasingly important, in part due to the rapid development of multimedia and virtual reality applications. Two traditional techniques for synthesizing music are frequency modulation (FM) synthesis and Wavetable (sample-and-play) synthesis. Generally, FM methods generate sounds using sinusoidal oscillators. Wavetable methods store sound segments produced by actual instruments and synthesize the instruments by playing back digitally processed sequences of the sound segments. Both FM and Wavetable sound synthesis systems have their drawbacks. For instance, although FM synthesis can produce a wide range of interesting sounds and Wavetable synthesis is able to produce tones having timbres close to that of musical instruments, both methods are deficient at producing the large dynamic sound range capable of being produced by acoustic instruments.

An alternate, more recent technique, for electronically synthesizing sound use, digital waveguide filters (DWFs). DWFs mathematically simulate, using a bi-directional delay line with modification filters, wave propagation on a plucked string. That is, DWFs physically model wave propagation occurring in the string. A number of patents and publications describe music synthesis using DWFs, including: U.S. Pat. No. 4,984,276 to Julius O. Smith; U.S. Pat. No. 5,212,334 to Julius O. Smith; U.S. Pat. No. 5,448,010 to Julius O. Smith; and the publication by Julius O. Smith, "Physical Modeling Using Digital Waveguides," *Computer Music Journal*, Vol. 16, No. 4, 1992. The contents of these three patents and the publication are incorporated by reference herein.

DWFs provide a "virtual string" that can authentically simulate the dynamics of a plucked string. However, DWF modeling requires a number of physical string parameters that are difficult to measure directly. For example, parameters describing the amount of energy loss (the energy loss constant) and traveling wave reflection (reflection coefficient) at any particular point in the string often must be determined by cumbersome trial-and-error methods.

There is, therefore, a need in the art to be able to synthesize sounds produced by a plucked string using a "virtual string" that can be modeled with easily obtainable parameters.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first aspect consistent with the present invention is directed to a method of synthesizing sounds produced by a plucked string. The method comprises a plurality of steps, including, generating an input waveform corresponding to an initial plucking of a string; initializing nodes of a neural network with values based on the input waveform; iteratively changing the node values; outputting a waveform based on selected ones of the node values at a plurality of the iterations; and generating sound based on a sequence of the output waveforms, the generated sound simulating the sound made by this particular plucked string.

A second method consistent with the present invention is directed to simulating the behavior of traveling waves in a string. The method comprises the steps of: stimulating a recurrent neural network, the recurrent neural network including groups of neurons arranged to simulate wave propagation through a scattering junction; and iteratively evaluating the neurons of the neural network.

A third method consistent with the present invention is directed to a method of training a recurrent neural network. The method comprises the steps of: measuring a time-varying sequence of vibrational values of a plucked string; initializing the recurrent neural network by setting displacement neurons in the neural network to values based on the measured time-varying sequence; iteratively calculating values of neurons in the recurrent neural network based on the initial values of the displacement neurons; calculating a total cost function value based on the measured sequence of vibrational values and the values of the displacement neurons obtained in the step of iteratively calculating values; and adjusting weights corresponding to the neurons in the recurrent neural network when the total cost function is above a predetermined threshold.

Other aspects consistent with the present invention are directed to a computer readable media containing instructions for execution the methods similar to the first, second, and third aspects of the invention.

Another aspect consistent with the present invention is directed to a recurrent neural network having displacement nodes, arrival nodes, and departure nodes. The departure nodes receive values output from the displacement nodes and values output from arrival nodes that are associated with a displacement node corresponding to a first predetermined location on the string, the departure nodes outputting values to arrival nodes that are associated with a displacement node corresponding to a second predetermined location on the string.

Still another aspect of the present invention is directed to an electronic apparatus for synthesizing sounds produced by plucked string instruments. The apparatus comprises: a memory for storing virtual models of strings that are to be synthesized; a waveform generation section for generating initial waveforms stimulating the virtual models; a scattering recurrent network synthesis section for generating time-varying waveforms using a recurrent neural network with neurons assigned the weighting values stored in the memory; and a speaker for outputting the synthesized time-varying waveforms.

BRIEF DESCRIPTION OF THE DRAWINGS

The accompanying drawings, which are incorporated in and constitute a part of this specification, illustrate several embodiments consistent with this invention and, together with the description, help explain the principles of the invention. In the drawings.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

This disclosure describes methods and systems for physically modeling and synthesizing sounds produced by plucked-string instruments using a recurrent neural network. The recurrent neural network, called a Scattering Recurrent Network (SRN) is based on the physics of waves traveling in the string. Vibration measured from a plucked string is used as the training data for the SRN.

The trained SRN is a virtual model capable of generating tones similar to the tones generated by the physical string. As with a real string, the "virtual string" corresponding to the SRN responds differently to different types of string "plucking" motions.

String Vibration Model

Figure 1:
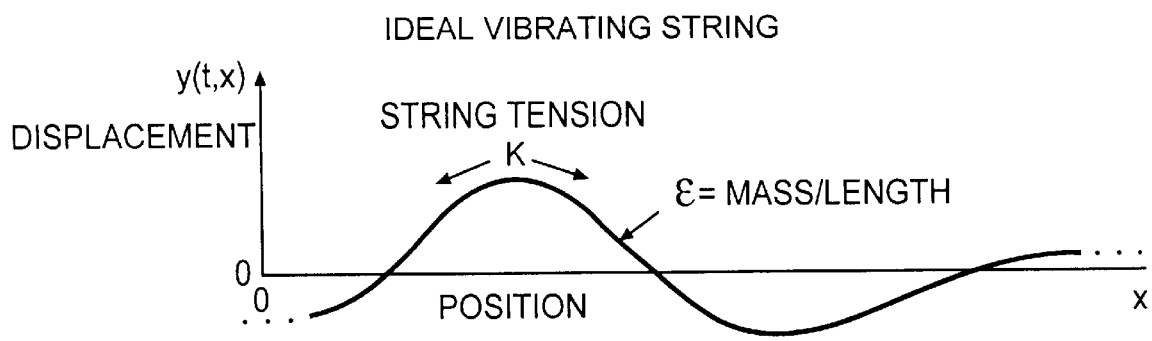
FIG. 1 is a graph illustrating vibration of an ideal string.

An initial step in establishing a physical model of a vibrating string is the formulation of a mathematical model representing the dynamics of the string. One well known model of a vibrating string uses the equation:

$$Ky''=\epsilon\ddot{y} \quad (1)$$

where $K \triangleq$ string tension, $y \triangleq y(t, x)$ $E \triangleq$ linear mass density, $\dot{y} \triangleq \frac{\partial}{\partial t} y(t, x)$ $y \triangleq$ string displacement, $y' \triangleq \frac{\partial}{\partial x} y(t, x)$ This model assumes an ideal string, i.e., a string that is lossless, linear, uniform, volumeless, and flexible. FIG. 1 is a graph illustrating the relationship of the variables used in equation (1).

By varying the string startup and boundary conditions, the solution for wave movement in the string can be derived from equation (1) as the aggregate of two transmission waves of the same velocity, one moving to the left and one moving to the right. The general solution is:

$$y(x,t)=y_r(t-x/c)+y_l(t+x/c), \quad (2)$$

where c=square_root(K/e) represents the horizontal wave velocity, $y_r(t-x/c)$ and $y_l(t+x/c)$ express transmission waves traveling to the right and the left, respectively, and y(x,t) is the amount of displacement (vibration) of the string at position x and time t.

Equation (2) describes wave movement for a lossless wave moving through al string that has ideal uniformity and flexibility. In real life, friction consumes energy. A resistive force in direct proportion to the string's vibration velocity can be used to simulate frictional forces. Assuming a resistive force constant of $\mu$, resistive force can be added to equation (1), yielding the wave equation:

$$Ky''=u\dot{y}+\epsilon\ddot{y} \quad (3)$$

which can be used to derive an equation for a traveling-wave experiencing energy loss:

$$y(x,t)=e^{-(u/2\epsilon)(x/c)}y_r(t-x/c)+e^{(u/2\epsilon)(x/c)}y_l(t+x/c) \quad (4)$$

To convert the traveling-wave solution of equation (4) into the digital domain, it is necessary to sample the traveling wave amplitude at intervals of T seconds. Because the wave velocity is c, the physical interval between samples on a string, $\Delta x$, equals cT. The digital version of equation (4) is thus $$\begin{aligned}y(x_m, t_n) &= e^{-(u/2\epsilon)(x_m/c)}y_r(t_n - x_m/c) + e^{(u/2\epsilon)(x_m/c)}y_l(t_n + x_m/c) \quad (5)\\ &= e^{-(u/2\epsilon)mT}y_r((n-m)T) + e^{(u/2\epsilon)mT}y_l((n+m)T)\\ &= \varphi_r(t_n, x_m) + \varphi_l(t_n, x_m)\end{aligned}$$

where $t_n$=nT (n is an integer), $x_m$=(m)($\Delta x$)=mcT (m is an integer). By further defining the energy loss constant (passive loss factor) as w≡$e^{-\mu T/2\epsilon}$ and $f_r(n-m) \equiv y_r((n-m)T)$, equation (5) can be rewritten as $$y(t_n,x_m)=\phi_r(t_n,x_m)+\phi_l(t_n,x_m)=w^m f_r(n-m)+w^{-m}f_l(n+m) \quad (6)$$

With actual instruments, the two ends of the string are typically stationary, thus the amount of vibration at the end points of the strings is always zero. Assuming a string length of L, this restriction can be imposed on equation (6), with the result $$\begin{cases} y(t_n, 0) = 0 = \varphi_r(t_n, 0) + \varphi_l(t_n, 0) \\ y(t_n, L) = 0 = \varphi_r(t_n, L) + \varphi_l(t_n, L) \end{cases} \quad (7)$$

Accordingly, at the right and left end points of the string, the transmission waves moving to the right and left can be expressed as $$\begin{cases} \varphi_r(t_n, 0) = -\varphi_l(t_n, 0) \\ \varphi_l(t_n, L) = -\varphi_r(t_n, L) \end{cases} \quad (8)$$

Figure 2:
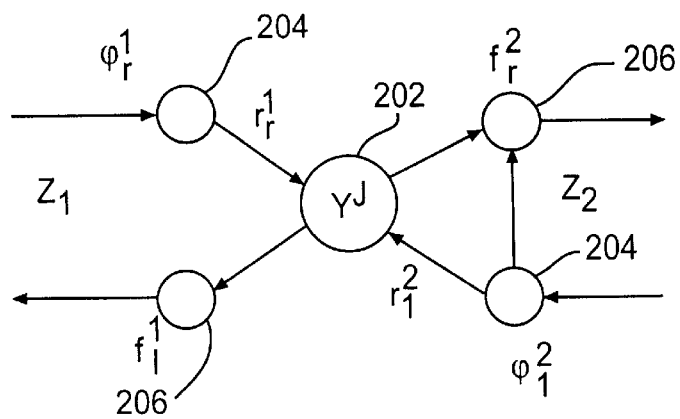
FIG. 2 is a diagram illustrating a model of a scattering junction.

Factors such as lack of uniformity in the string cause changes of acoustic impedance in the string, which tend to reflect the traveling waves. The phenomenon of changing acoustic impedance can be modeled as intersection points, called scattering junctions, that partially reflect the traveling waves. FIG. 2 is a diagram illustrating a model of a scattering junction 202 having left and right impedances of $Z_1$ and $Z_2$, right-moving and left-moving input transmission waves, $\phi_r^1$ and $\phi_l^2$, respectively, and right and left moving departing transmission waves, $f_r^2$ and $f_l^1$, respectively.

The vibration at junction 202 can be expressed as $$y^J = r_r^1 \cdot \phi_r^1 + r_l^2 \cdot \phi_l^2 \quad (9)$$

where, in order to simplify the traveling wave expression, the symbols, $(x_m, t_n)$ have been omitted from equation (9). The departure waves, $f_l^1$ and $f_r^2$, can be expressed as $$\begin{cases} f_l^1 = y^J - \varphi_r^1 \\ f_r^2 = y^J - \varphi_l^2 \end{cases} \quad (10)$$

As described above, equations (1) through (8) are used to model physical vibration of a string. Scattering junctions, introduced in equations (9) and (10), and illustrated in FIG. 2, extend this model to include partial wave reflections along the string.

Consistent with the present invention, traveling waves in a string are modeled to implement equations (1) through (10) using a closed circuit feedback type of recurrent neural network. To assist the reader in understanding concepts of the present invention, a brief review of neural networks will now be presented.

Neural Networks

Figure 3:
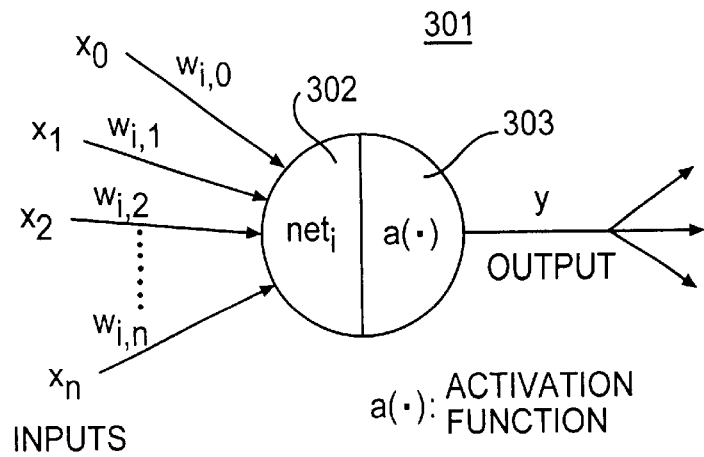
FIG. 3 is a diagram of a neuron used in an artificial neural network.

The basic building block of a neural network is the neuron. FIG. 3 is a diagram illustrating neuron 301, which includes an input section 302 and an output section 303. Input section 302 receives signals and generates a weighted sum corresponding to the received input signals. The weighted sum is passed through an activation function associated with output section 303, and the result, y, is output from the neuron.

Figure 4:
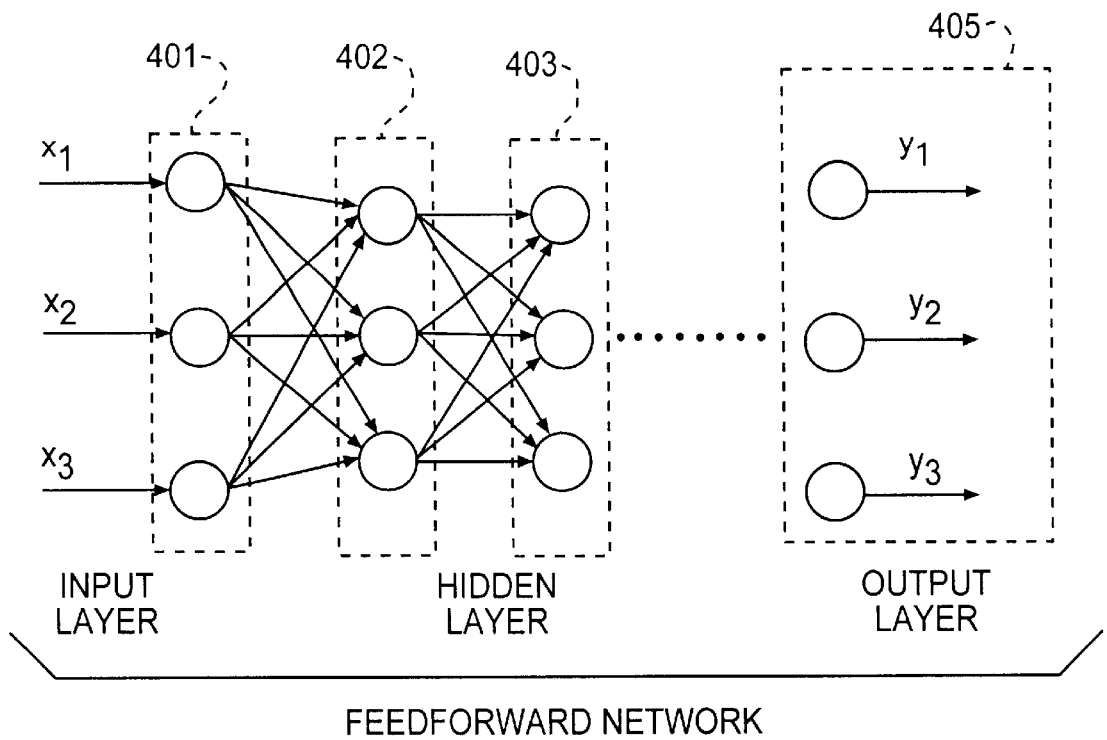
FIG. 4 ia a diagram of a feedforward type neural network.

A feedforward neural network typically includes multiple neurons arranged in two or more layers, as shown in FIG. 4. Input layer 401 receives external stimuli labeled as input signals $x_1$–$x_3$. Each neuron in input layer 401 transmits its output to the neurons in the next neuron layer, hidden layer 402. In a similar manner, the neurons in layer 402 transmit their outputs to the neurons in hidden layer 403, which transmit their outputs to the neurons in the next layer. This process continues until the neurons in the final layer, output layer 405, are stimulated. The output of the neurons in layer 405 is the output of the neural network.

Figure 5A:
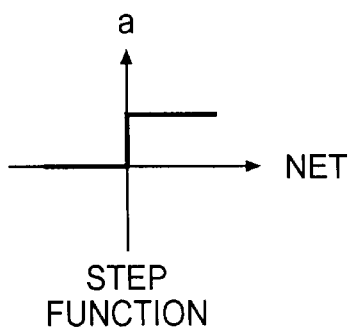
FIGS. 5A–5C are graphs of neuron activation functions.
Figure 5B:
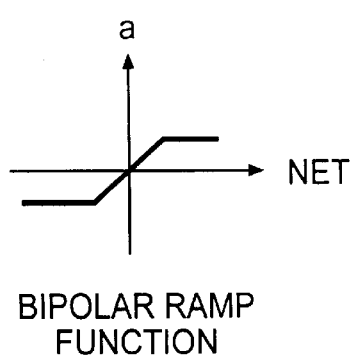
Figure 5C:
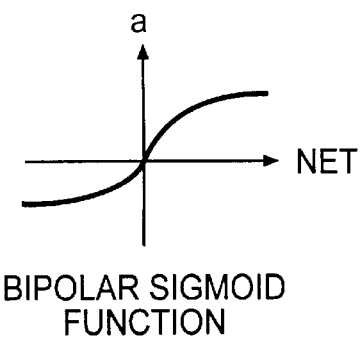

The output of a neuron is equal to the weighted sum of its inputs passed through an activation function. More specifically, the weighted sum, $net_i$, is calculated as:

$$net_i = \Sigma w_{i,j} x_j - \Theta_i,$$

where $\Theta_i$ represents a bias value for the neuron and $wj_{i,j}$ represents a weighting value associated with input $x_j$ of neuron i. Exemplary activation functions include step functions, bipolar sigmoid functions, and bipolar ramp functions, as shown in FIGS. 5A–5C, respectively.

The neural network shown in FIG. 4 is a feedforward type neural network. In a feedforward network, the input layer receives signals from outside the network, the signals proceed successively through the network, and the output layer forwards the processed signals out of the network.

Figure 6:
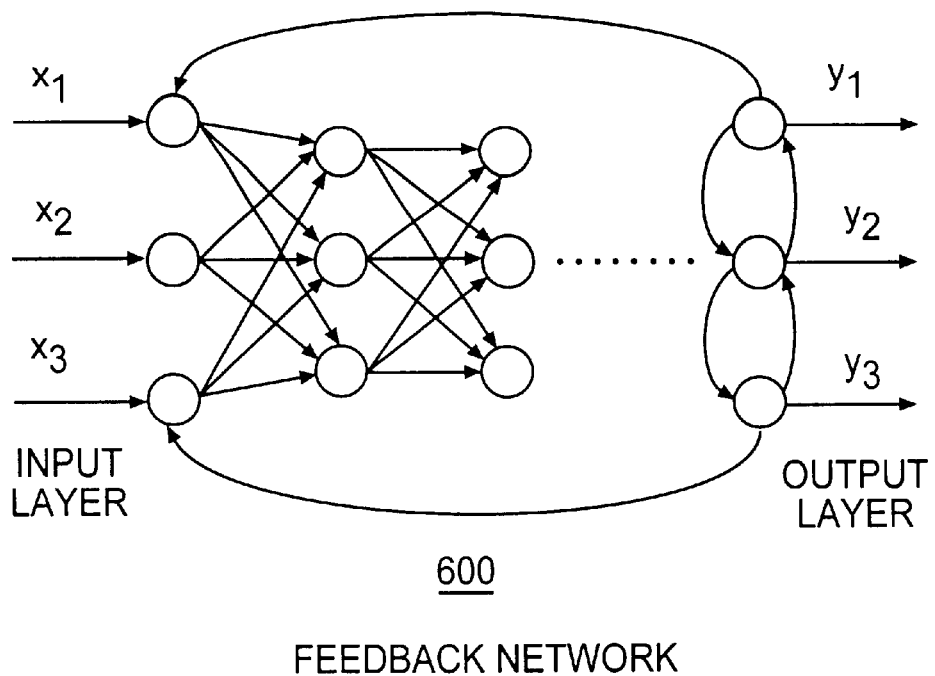
FIG. 6 is a diagram of a feedback type neural network.

A second common type of neural network are feedback type neural networks. An exemplary feedback type neural network is shown in FIG. 6. In feedback network 600, signals output from a layer may be fed back to a previous layer. A neural network with at least one mutually connected layer is a feedback network. A special type of feedback neural network, in which the signal transmission path forms a closed circuit, is called a recurrent neural network. Neural network 600 is an example of a recurrent neural network.

Neural networks "learn" by adjusting the weights, $w_{i,j}$, associated with the inputs of each neuron. Typically, to train a neural network, training data having input values and corresponding known output values are run through the neural network. The weights, $w_{i,j}$, are adjusted so that the network's output values tend to match the known training values. Many techniques are known for appropriately adjusting the weights, $w_{i,j}$. One popular technique for adjusting the weights in a feedback network is known as Error Backpropagation.

Figure 7:
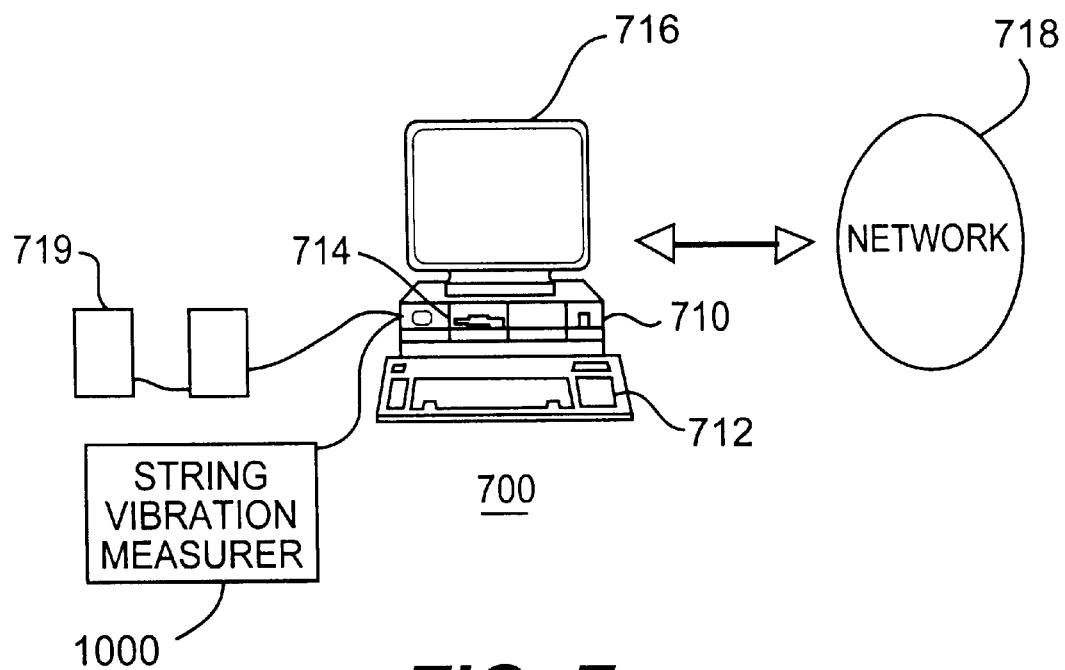
FIG. 7 is a diagram of a general purpose computer on which methods consistent with the present invention may be implemented.

Neural networks may be implemented in a variety of ways, such as by a computer or through special neural network hardware. FIG. 7 is a diagram of a general purpose computer on which methods consistent with the present invention may be implemented.

Computer system 700 is preferably a multimedia computer system on which neural networks may be trained and/or used. Computer system 700 includes a chassis 710, which holds the computer's main processor and main memory; an input device such as keyboard 712; a storage device such as floppy or hard disk 714; and a display such as monitor 716. Computer system 700 is optionally connected to a network 718, and may be operated directly by a user or through a network. Speakers 719 deliver audio output to the user.

Many variations of computer system 700 are possible. For example, storage device 714 may additionally include storage media such as optical disks, and user input device 712, instead of or in addition to keyboard 712, may include any type of user input device, such as: an electronic mouse, a trackball, a lightpen, a touch-sensitive pad, a digitizing tablet, or a joystick.

Additional input devices, such as devices used to capture and modify audio data, may be used to input data to computer system 700. String vibration measuring device 1000 is one such input device. This device is described below in more detail with reference to FIG. 10.

Scattering Recurrent Network

Consistent with the present invention, a closed circuit feedback type of recurrent neural network is used to implement the previously described string vibrational model. This recurrent neural network will be referred to as a scattering recurrent network (SRN).

Figure 8:
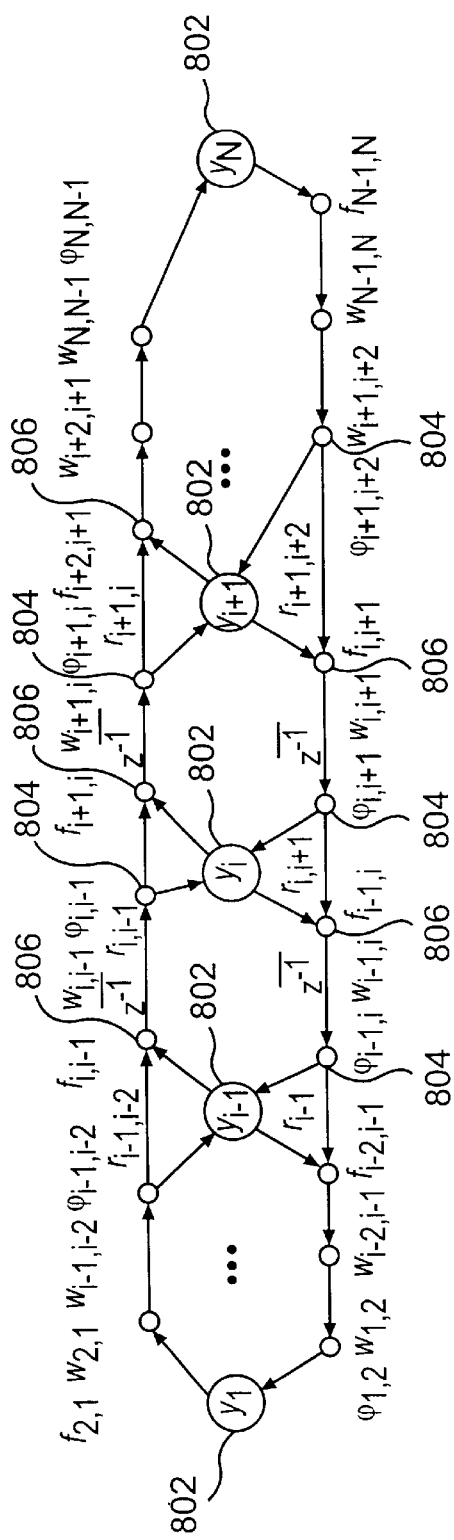
FIG. 8 is a diagram illustrating a scattering recurrent network.

FIG. 8 is a diagram illustrating scattering recurrent network 800. The upper half of SRN 800 represents transmission waves moving to the right and the lower half represents transmission waves moving to the left. Each of nodes 802, 804, and 806 correspond to a neuron in the SRN. Neurons 802 simulate the degree of vibration, y, at each sampling location on the string, and will be called displacement nodes. Displacement nodes 802 have scattering junction characteristics. Neurons 804 (labeled $\phi$) are arrival nodes that represent transmission waves flowing into displacement nodes 802. Finally, neurons 806 (labeled f) are departure nodes that represent transmission waves flowing out of displacement nodes 802. The links between arrival nodes 804 and departure nodes 806 include an energy loss factor and a unit delay.

Figure 9A:
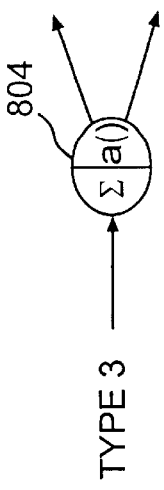
FIGS. 9A–9C are diagrams illustrating nodes of a scattering recurrent network.
Figure 9B:
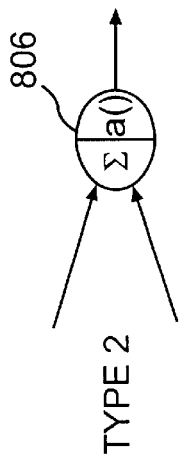
Figure 9C:
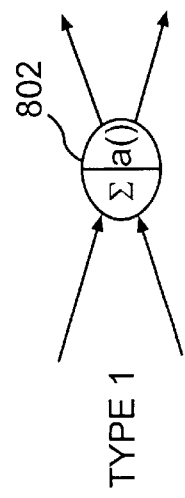

FIGS. 9A–9C are diagrams illustrating nodes 802, 804, and 806, respectively, in more detail. Each displacement node 802, as shown in FIG. 9A, receives two inputs and generates two outputs. Each arrival node 804, shown in FIG. 9C, receives one input and generates two outputs. Each departure node 806, shown in FIG. 9B, receives two inputs and generates one output.

The dynamics of SRN 800, shown in FIGS. 8 and 9, are described by a number of equations. Specifically, values of the upper and lower half arrival nodes 804 at time t+1 are given by $$\begin{cases} \varphi_{i,i-1}(t+1) = a[net^{\varphi}_{i,i-1}(t)] = a[w_{i,i-1} \cdot f_{i,i-1}(t)] \\ \varphi_{i,i+1}(t+1) = a[net^{\varphi}_{i,i+1}(t)] = a[w_{i,i+1} \cdot f_{i,i+1}(t)] \end{cases} \quad (11)$$

The t+1 instantaneous degree of vibration at each displacement node 802 is expressed as $$y_i(t+1) = \begin{cases} a[net^y_i(t+1)], & i = 2, \ldots, N-1 \\ 0, & i = 1 \text{ or } i = N \end{cases} \quad (12)$$

where $$net^y_i(t+1) = r_{i,i-1} \cdot \varphi_{i,i-1}(t+1) + r_{i,i+1} \cdot \varphi_{i,i+1}(t+1) \quad (13)$$

while the departure waves at departure nodes 806 moving to the left and right at timid t+1 are obtained with the equation $$\begin{cases} f_{i+1,i}(t+1) = a[net^f_{i+1,i}(t+1)] = a[y_i(t+1) - \varphi_{i,i+1}(t+1)] \\ f_{i-1,i}(t+1) = a[net^f_{i-1,i}(t+1)] = a[y_i(t+1) - \varphi_{i,i-1}(t+1)] \end{cases} \quad (14)$$

In equations (11)–(14) the neuron activation functions, a( ), are preferably one of the functions illustrated in FIGS. 5A–5C, such as the bi-polar ramp function shown in FIG. 5B.

Measurement of Training Data

Before SRN 800 can be used to synthesize string sounds, it must be trained. Neural networks are trained using pre-measured or pre-derived training data.

Figure 10:
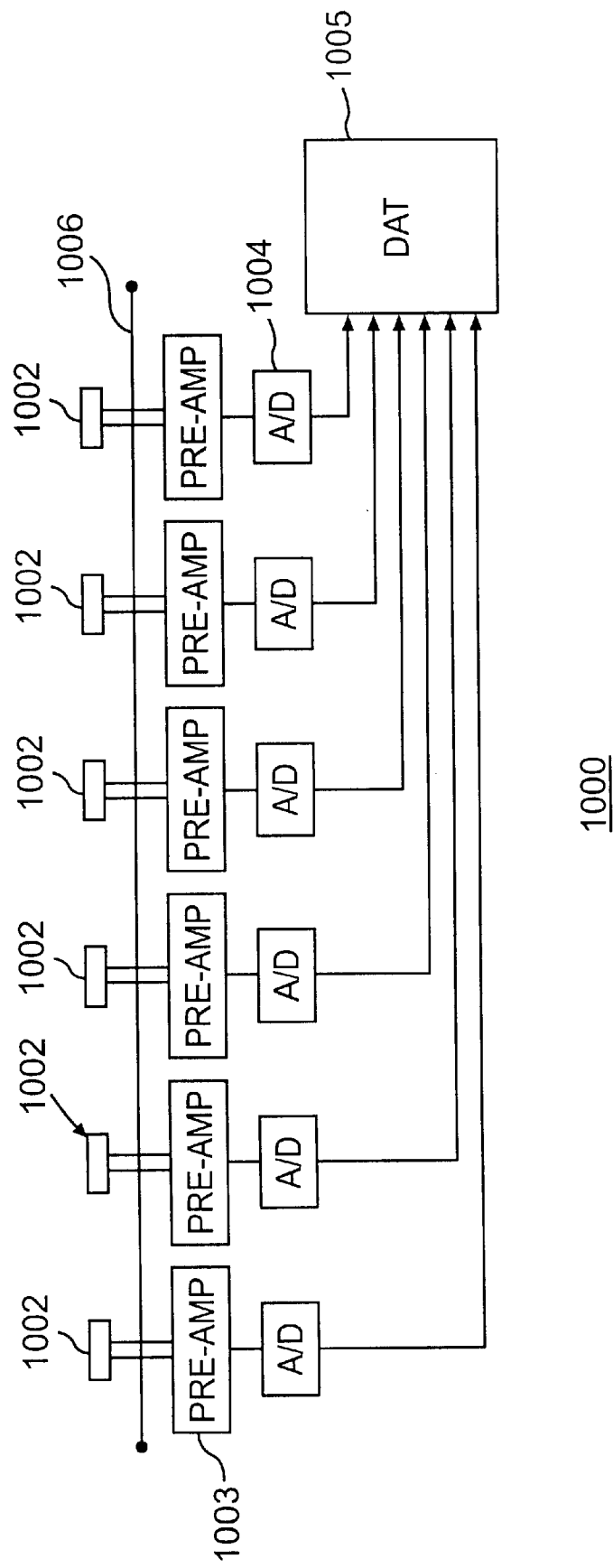
FIG. 10 is a block diagram of a steel string measuring device consistent with an aspect of the present invention for obtaining string vibration.

FIG. 10 is a block diagram of a steel string measuring device consistent with an aspect of the present invention for obtaining string vibration values that are used by computer 700 as training data. Measuring device 1000 includes several electric guitar electromagnetic sensors 1002, such as those found in electric guitars, located at each sampling point along string 1006. Electromagnetic sensors 1002 are controlled to synchronously sample the vibration values at each sampling point and for each sampled time point.

Electromagnetic sensors 1002 each include a coil with a permanent magnet. Plucking the steel string causes magnetic flux changes that induce electric signals in the coils of sensors 1002. The sampled values are based on the induced electric signals. The sampled values are amplified and converted to digital form by pre-amps 1003 and analog-to-digital converters 1004. The analog-to-digital converter may digitize its analog input to a 16-bit quantization level at a sampling rate of 32 kHz. The digital samples may then be stored on a multi-track real-time digital audio storage device (DAT) 1005, such as the Audio Engine, from Sprectral Company, USA.

Although measuring device 1000 is illustrated as having six electromagnetic sensors, the number of electromagnetic sensors can be arbitrarily increased or decreased depending on experimental requirements. Further, the electromagnetic sensors are preferably mounted on a slide positioning assembly that allows the sensors to be moved along the track of the slide so that the sampling locations may be easily changed.

Training of the Scattering Recurrent Network

As discussed, training data for SRN 800, obtained by measuring device 1000, is a time sequence of string vibrational measurements taken at points longitudinally along the string. The vibrational measurements represent the instantaneous degree of vibration at selected ones of displacement nodes 802.

A number of training algorithms are known for training recurrent neural networks. Preferably, computer 700 uses the Back-propagation Through Time (BPTT) method to train the SRN, although other recurrent training algorithms may prove satisfactory. The BPTT training algorithm is described in *Introduction to the Theory of Neural Computing*, A. Hertz and R. G. Palmer, Addison-Wesley, New York, 1991 and "An Efficient Gradient-Based Algorithm for On-Line Training of Recurrent Network Trajectories," R. Williams and J. Peng, Neural Computing, Vol. 2, p. 490–501, 1990.

A brief explanation of the BPTT training algorithm will now be described with reference to FIGS. 11A and 11B.

Figure 11A:
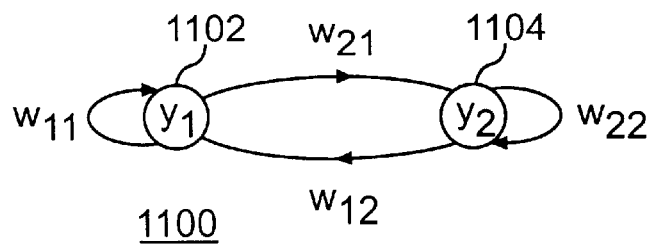
FIG. 11A is diagram of a bi-neural recurrent neural network.

FIG. 11A is diagram illustrating a simple bi-neural recurrent neural network 1100. The network is a "completely linked" recurrent network, as each of its two neurons, 1102 and 1104, receive two inputs, one from itself and one from the other neuron. BPTT effectively "opens up" (or "time-unfolds") network 1100 through time to obtain a network that resembles a feedforward network. The "opened up" version of network 1100 is illustrated in FIG. 11B. The beginning values of the network are the values at $y_1(0)$ and $y_2(0)$, respectively. The values for neurons 1102 and 1104 at time 1 are $$\begin{cases} y_1(1) = a(w_{11} \cdot y_1(0) + w_{12} \cdot y_2(0)) \\ y_2(1) = a(w_{22} \cdot y_2(0) + w_{21} \cdot y_1(0)) \end{cases} \quad (15)$$

Extrapolating from this equation, the values of the neurons at any time, t+1, can be obtained from the equation $$\begin{cases} y_1(t+1) = a(w_{11} \cdot y_1(t) + w_{12} \cdot y_2(t)) \\ y_2(t+1) = a(w_{22} \cdot y_2(t) + w_{21} \cdot y_1(t)) \end{cases} \quad (16)$$

Figure 11B:
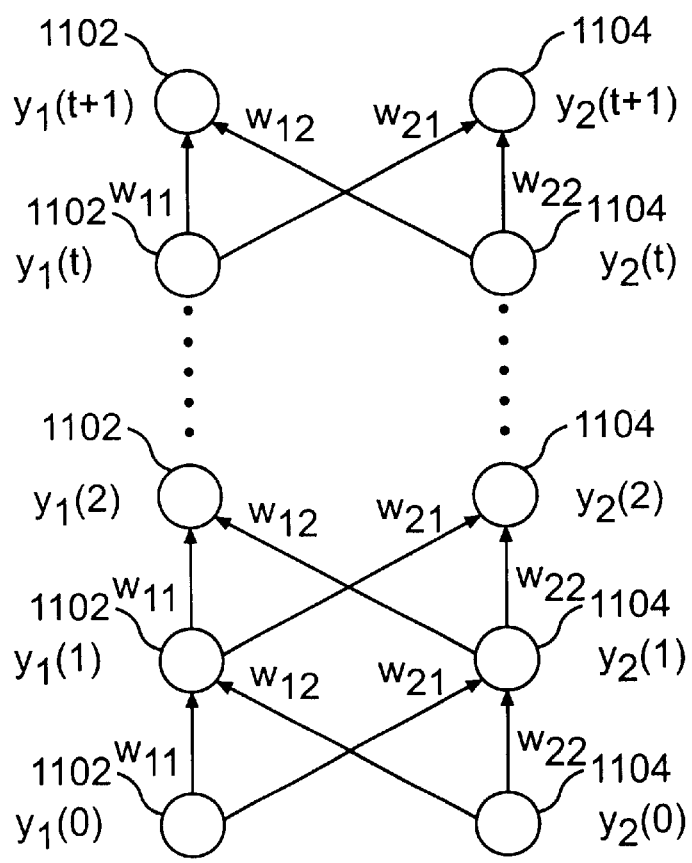
FIG. 11B is a diagram of an "time-unfolded" version of the neural network shown in FIG. 11A.

On the "feedforward" network shown in FIG. 11B, which was generated by time-unfolding network 1100, the backpropagation training algorithm is employed to find trained values for weights $w_{11}$, $w_{12}$, $w_{21}$, and $w_{22}$. Backpropagation is well known in the art for training feedforward neural networks. Essentially, backpropagation defines a cost function (or error function) based on the weights, w, and then draws gradients from the cost function. Negative gradients are followed in an attempt to find a cost function minimum.

Figure 12:
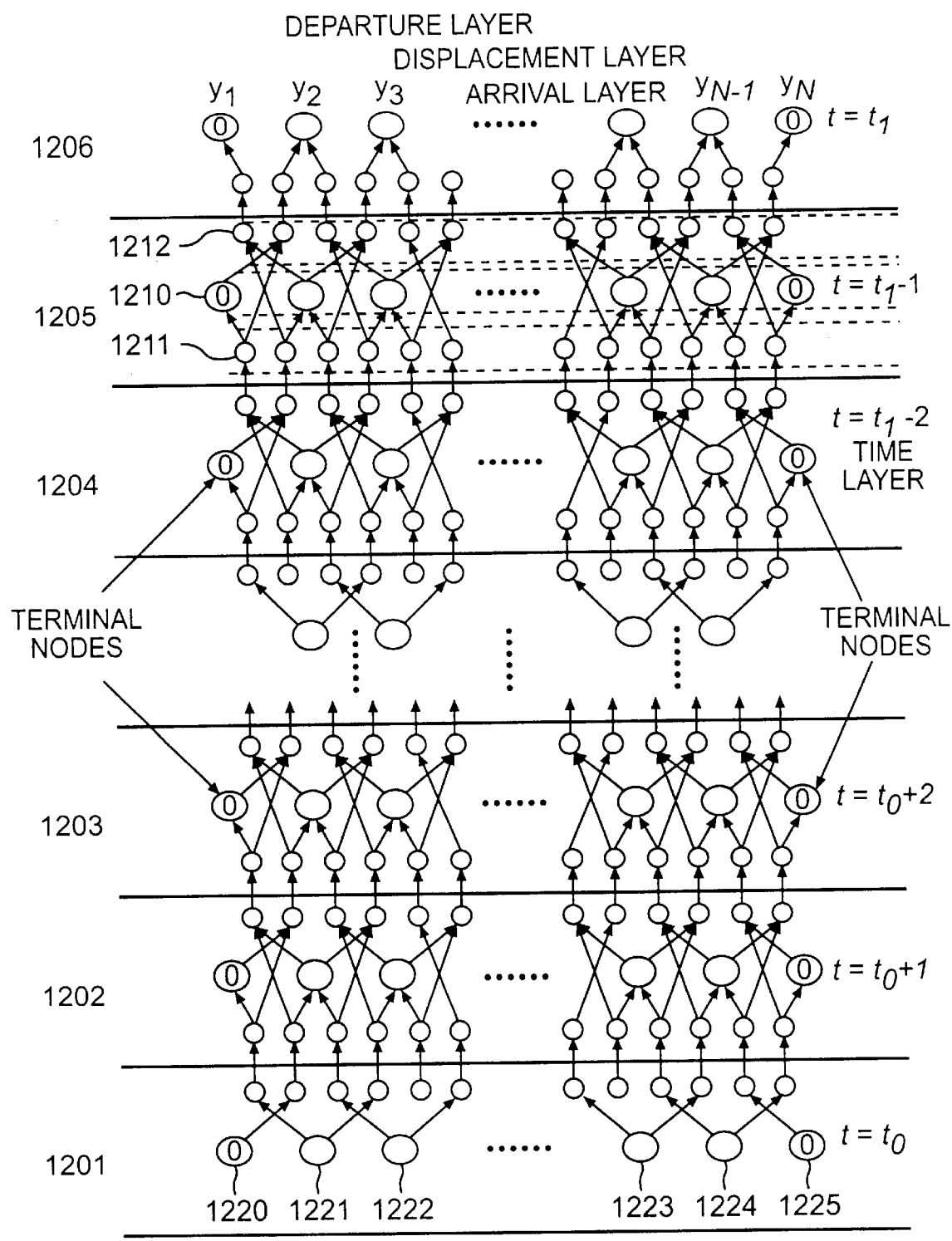
FIG. 12 is diagram of a scattering recurrent network "time-unfolded"

FIG. 12 is a diagram of SRN 800 time-unfolded. The network comprises a plurality of time layers 1201–1206. Each of time layers 1201–1206 includes three subsidiary layers: a displacement layer, such as layer 1210; an arrival layer, such as. layer 1211; and a departure layer, such as layer 1212. The layers are respectively comprised of displacement nodes 802, arrival nodes 804, and departure nodes 806.

Each layer 1201–1206 may contain, for example, one-hundred displacement nodes. Six displacement nodes are labeled in layer 1201 as displacement nodes 1220–1225. As previously mentioned, the value of each displacement node corresponds to the amount of string vibration at the physical location in the string associated with the displacement node. In training the network, vibration values at various positions along the string are measured at multiple instances in time, to thereby create a set of time-varying sequences of vibrational values. The time sequences correspond to time layers. Practically, it is generally not possible to obtain a measured training vibrational value for every displacement node 1220–1225 in the network. For example, as shown in FIG. 12, only nodes 1220 and 1225 are set to measured training values (indicated by a 0 written in these nodes). Displacement nodes in which data is either input from an external source or output to an external device, such as displacement nodes 1220 and 1225, are called visible nodes. The remaining placement nodes are non-visible "hidden" nodes. For example, a string simulation may have eight visible nodes, all of which are used to construct output waveforms, but only six of which receive input values corresponding to measured string vibration.

To train SRN 800, a cost function is defined. Assuming $d_i(t)$ represents measured vibration values at the $i^{th}$ measurement location at time t (i.e., the desired node values), and A(t) represents the set of visible nodes, then the error signals at any time t can be defined as $$e_i(t) = \begin{cases} d_i(t) - y_i(t), & \text{if } i \in A(1) \\ 0, & \text{otherwise} \end{cases} \quad (17)$$

where $y_i(t)$ represents the output of the $i^{th}$ displacement node (i.e., the value generated by the neuron) at time t. An error function can be defined based on equation (17) as $$E(t) = 1/2 \sum_{i \in A(t)} e_i^2(t) \quad (18)$$

Assuming $t_0$ is the beginning of the training period and $t_1$ the end of the training period, a total cost function, based on the error function, may be defined as $$E^{total}(t_0, t_1) = \sum_{t=t_0+1}^{t_1} E(t) \quad (19)$$

When training SRN 800 using the measured vibration values, the object is to minimize the total cost function (19). A minimized cost function indicates that the outputs generated by the SRN displacement nodes are close to the measured values.

In order to achieve total cost function minimization, computer 700 calculates gradients of the parametric functions relating to the energy loss constants and the medium value reflection coefficients along the negative direction of the total cost function. Specifically, the degree of change corresponding to the energy loss constants are $$\begin{cases} \Delta w_{i+1,i} = -\eta \dfrac{\partial E^{total}(t_0, t_1)}{\partial w_{i+1,i}} = \eta \sum_{t=t_0+1}^{t_1} \delta_{i+1,i}^{\varphi}(t) \cdot f_{i+1,i}(t-1) \\ \Delta w_{i-1,i} = -\eta \dfrac{\partial E^{total}(t_0, t_1)}{\partial w_{i-1,i}} = \eta \sum_{t=t_0+1}^{t_1} \delta_{i-1,i}^{\varphi}(t) \cdot f_{i-1,i}(t-1) \end{cases} \quad (20)$$

and the degree of adjustment corresponding to the medium value reflection coefficient are $$\begin{cases} \Delta r_{i,i-1} = -\eta \dfrac{\partial E^{total}(t_0, t_1)}{\partial r_{i,i-1}} = \eta \sum_{t=t_0+1}^{t_1} \delta_i^y(t) \cdot \varphi_{i,i-1}(t) \\ \Delta r_{i,i+1} = -\eta \dfrac{\partial E^{total}(t_0, t_1)}{\partial r_{i,i+1}} = \eta \sum_{t=t_0+1}^{t_1} \delta_i^y(t) \cdot \varphi_{i,i+1}(t) \end{cases} \quad (21)$$

where $\eta$ represents the learning constant. A typical value for the learning constant is $10^{-5}$ to $10^{-7}$. Further, $$\begin{cases} \delta_i^y(t) = -\dfrac{\partial E^{total}(t_0, t_1)}{\partial net_i^y(t)} \\ \delta_{i+1,i}^{\varphi}(t) = -\dfrac{\partial E^{total}(t_0, t_1)}{\partial net_{i+1,i}^{\varphi}(t-1)} \\ \delta_{i-1,i}^{\varphi}(t) = -\dfrac{\partial E^{total}(t_0, t_1)}{\partial net_{i-1,i}^{\varphi}(t-1)} \end{cases} \quad (22)$$

Figure 13:
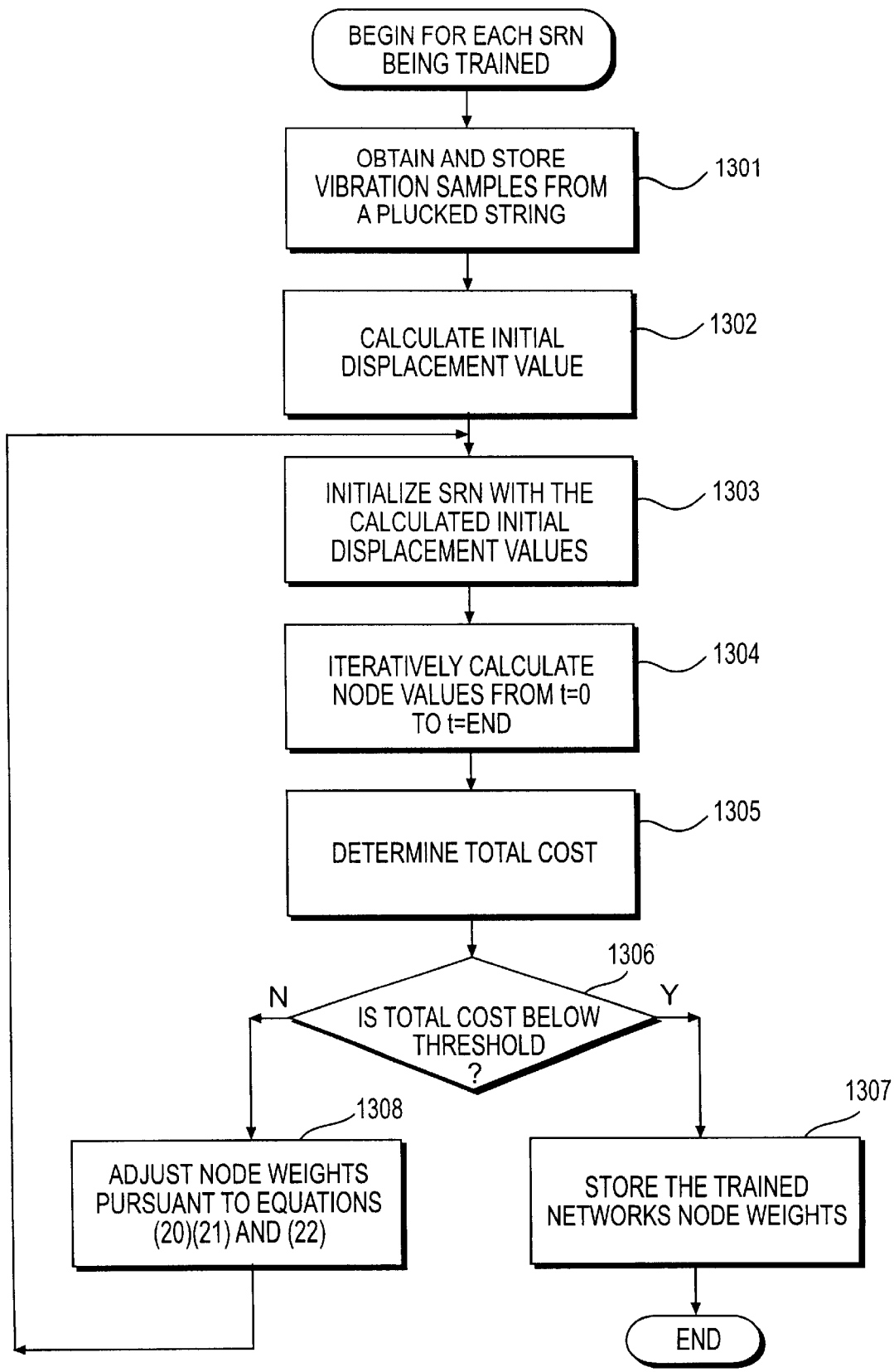
FIG. 13 is a flow chart illustrating methods consistent with the present invention for training a scattering recurrent network.

FIG. 13 is a flow chart illustrating methods consistent with the present invention for training the SRN. For each SRN to be trained, time-sequenced vibrational samples of the string to be simulated are obtained, as previously described, using steel string measuring device 1000 (step 1301). The initial (time zero) displacements that defined the starting position of the plucked string are determined and used to initialize the displacement values $y_i(0)$ (steps 1302, 1303). The waveform at beginning of the string plucking has the characteristic that the degree of displacement at the plucking location has the highest displacement throughout the simulation. For example, if the string is plucked by pulling the center of the string up 2 cm, the initial waveform would resemble a triangle—its largest value (2 cm) is in the center, and the other displacement nodes would be assigned linearly decreasing values out to the endpoint displacement nodes, which would have a value of zero. Initial values for the departure and arrival nodes at time equal to zero are also assigned. Preferably, these nodes are assigned values based on the loss factors being one and the reflection coefficient being zero. Alternatively, the initial values for these nodes can be randomly assigned.

Based on the initial node values assigned in step 1303, computer system 700 iteratively calculates and stores, using equations (11)–(14), the node values for each time increment (step 1304). From the stored displacement node values, the value of the total cost function is calculated using equation (19) (step 1305). If the total cost value is below a pre-specified error threshold, the network is considered trained (steps 1306, 1307). Otherwise, the node weights are adjusted, as previously described, based on equations (20) (21) and (22) (step 1308), and the node values are then recalculated based on the new weights.

Music Synthesis

Figure 14:
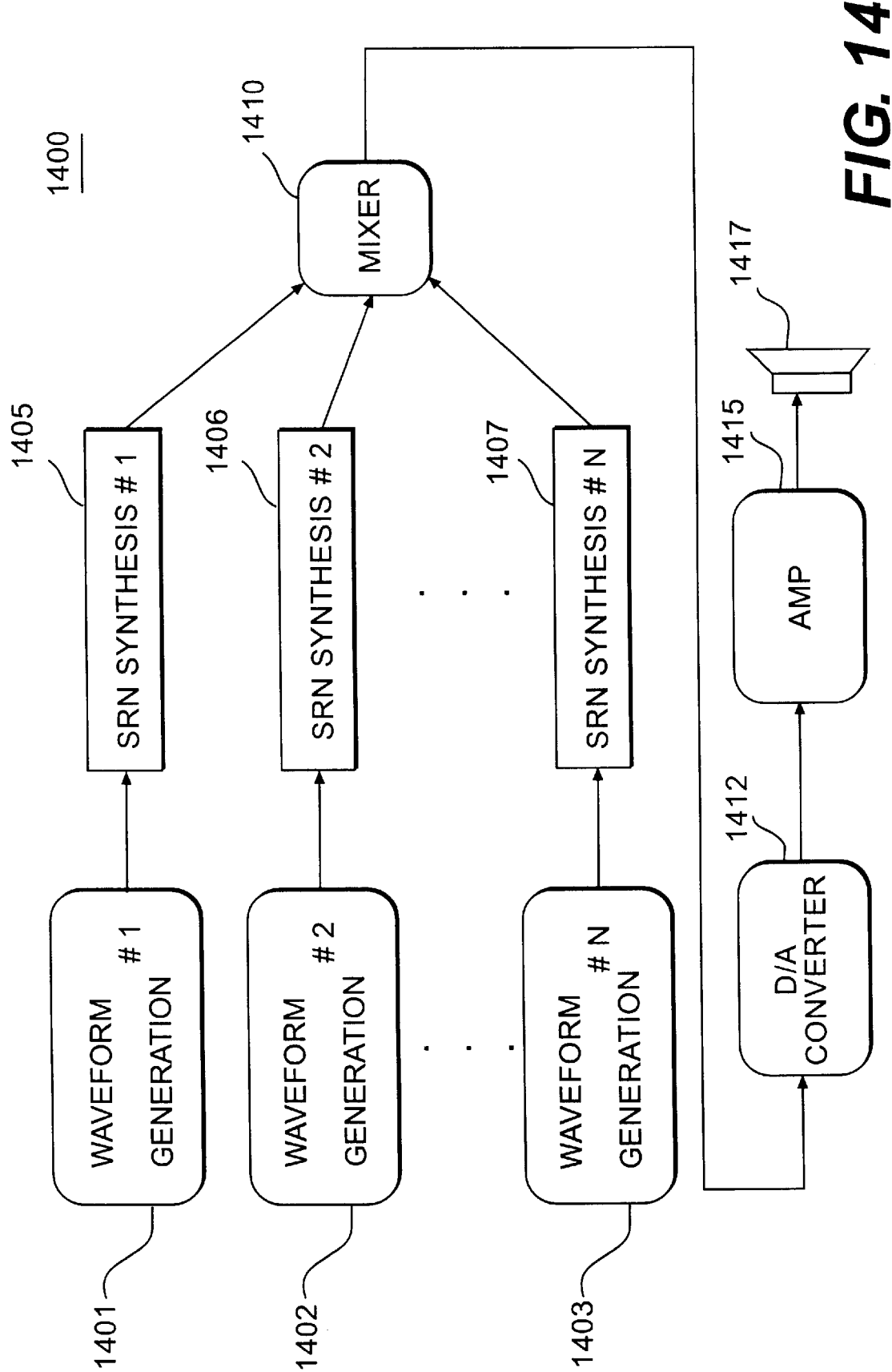
FIG. 14 is a diagram of music synthesis system consistent with the present invention.

After computer system 700 has trained the SRN for a particular string, music synthesis can be performed. FIG. 14 is a diagram illustrating a complete music synthesis system, which may be implemented on computer system 700.

Music synthesis system 1400 includes a plurality of waveform generation sections 1401 through 1403, each connected to a corresponding SRN synthesis section 1405 through 1407. Waveform generation sections 1401 through 1403 generate the plucking motions used to "play" the virtual strings of SRN synthesis sections 1405 through 1407. The waveforms generated by SRN synthesis sections 1405 through 1407 are input to mixer 1410. The mixed digital sound signal is then converted to all analog signal by D/A converter 1412, and output via amp 1415 and speaker 1417.

Figure 15A:
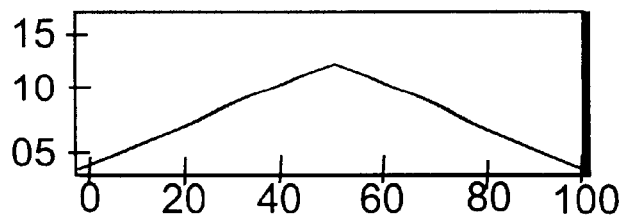
FIGS. 15A through 15E are graphs illustrating exemplary waveforms used to stimulate a scattering recurrent network.
Figure 15B:
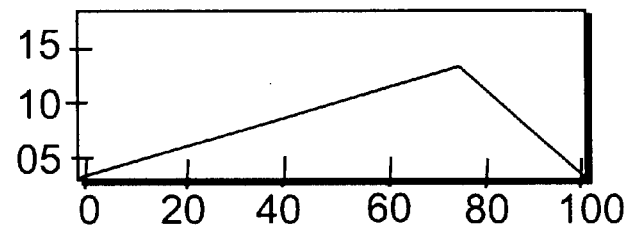
Figure 15C:
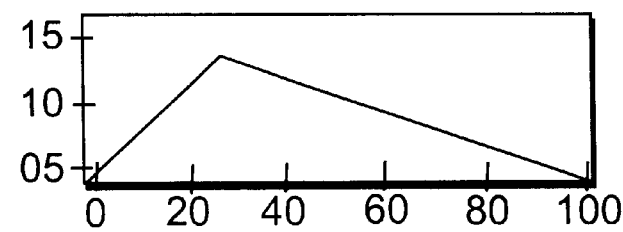
Figure 15D:
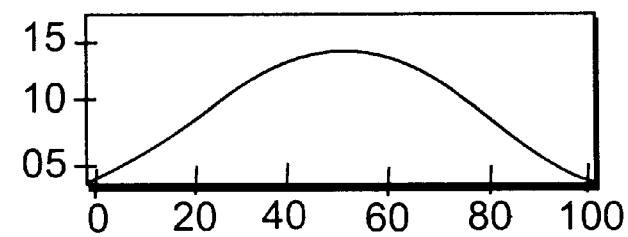
Figure 15E:
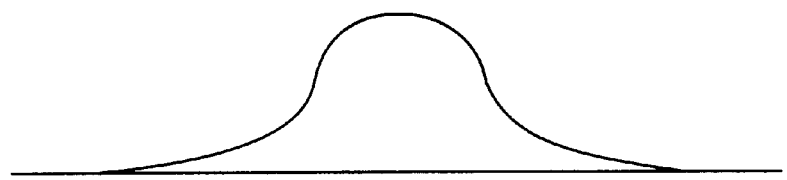

FIGS. 15A through 15E are graphs illustrating exemplary waveforms generated by waveform generation sections 1401 through 1403. FIG. 15A is a waveform simulating the use of a fingernail or a pick to pluck the string in the middle. Similarly, the waveforms of FIGS. 15B and 15C illustrate plucking of the string towards its right sides and left end, respectively. FIG. 15D is a waveform simulating plucking with the fleshy portion of the finger. FIG. 15E simulates a rapping or hitting of the string (for example, the waveform made by the hammer of a piano).

There are a number of methods through which the waveforms shown in FIGS. 15A through 15E can be generated. Three methods, in particular, will now be described in more detail: interpolation, function evaluation, and sketch point method.

Using the interpolation method, the user or the software assigns displacement to each important, predefined point on the string. The values of the remaining displacement nodes are then interpolated based on the predefined known points. The waveforms shown in FIGS. 15A through 15C were generated using interpolation.

Function evaluation is simply the generation of a waveform based on a mathematical function. The waveform of FIG. 15D, for example, was obtained from a Gauss function.

With the sketch point method, the user may assign any type of plucking waveform, preferably by graphically drawing or sketching the waveform using appropriate software. Sketching software that allows one to draw arbitrary waveforms; using a pointing device, such as a mouse, are well known and accordingly will not be described further.

Figure 16:
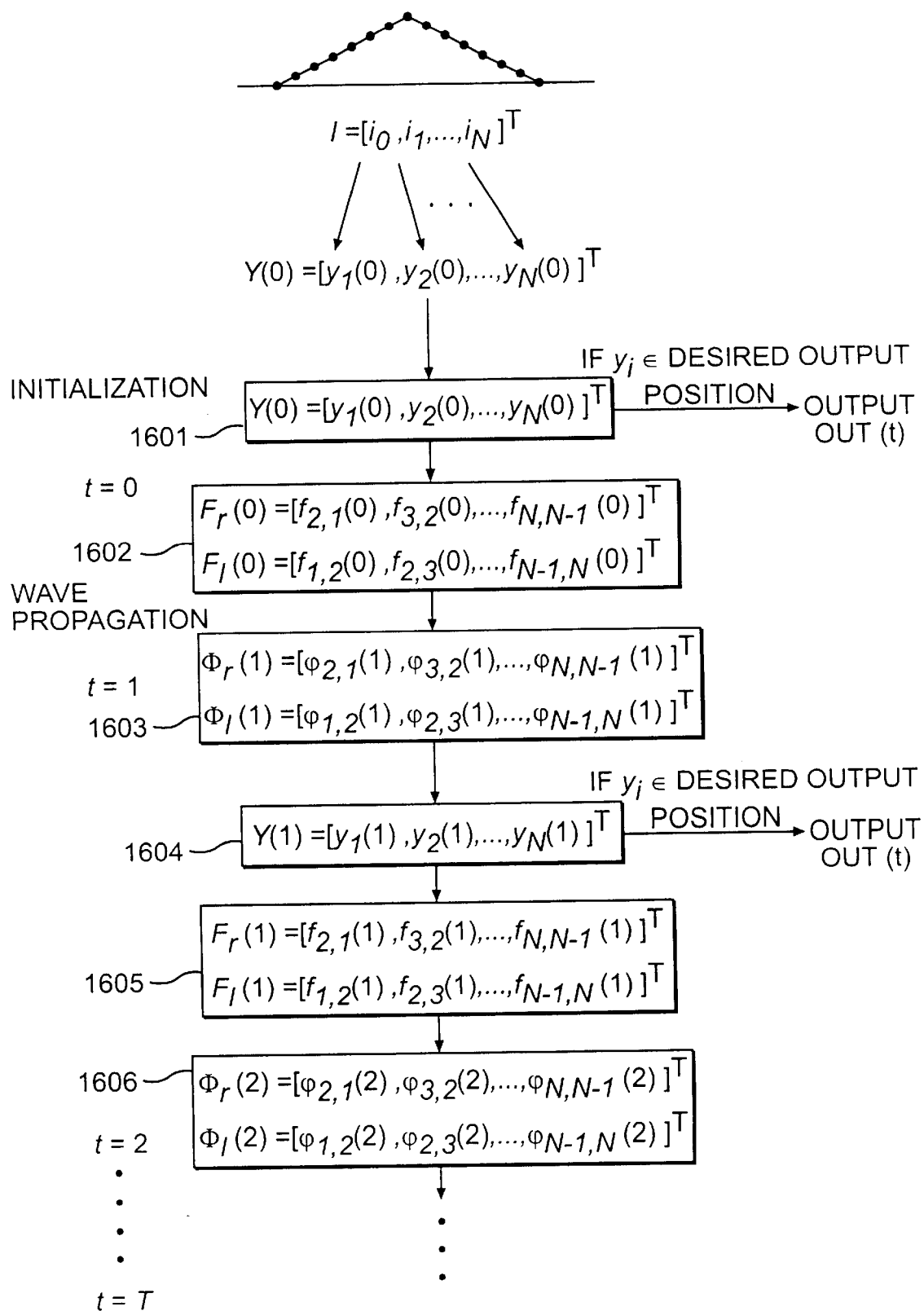
FIG. 16 is a flow chart illustrating methods consistent with the present invention for synthesizing sound.
Figure 17A:
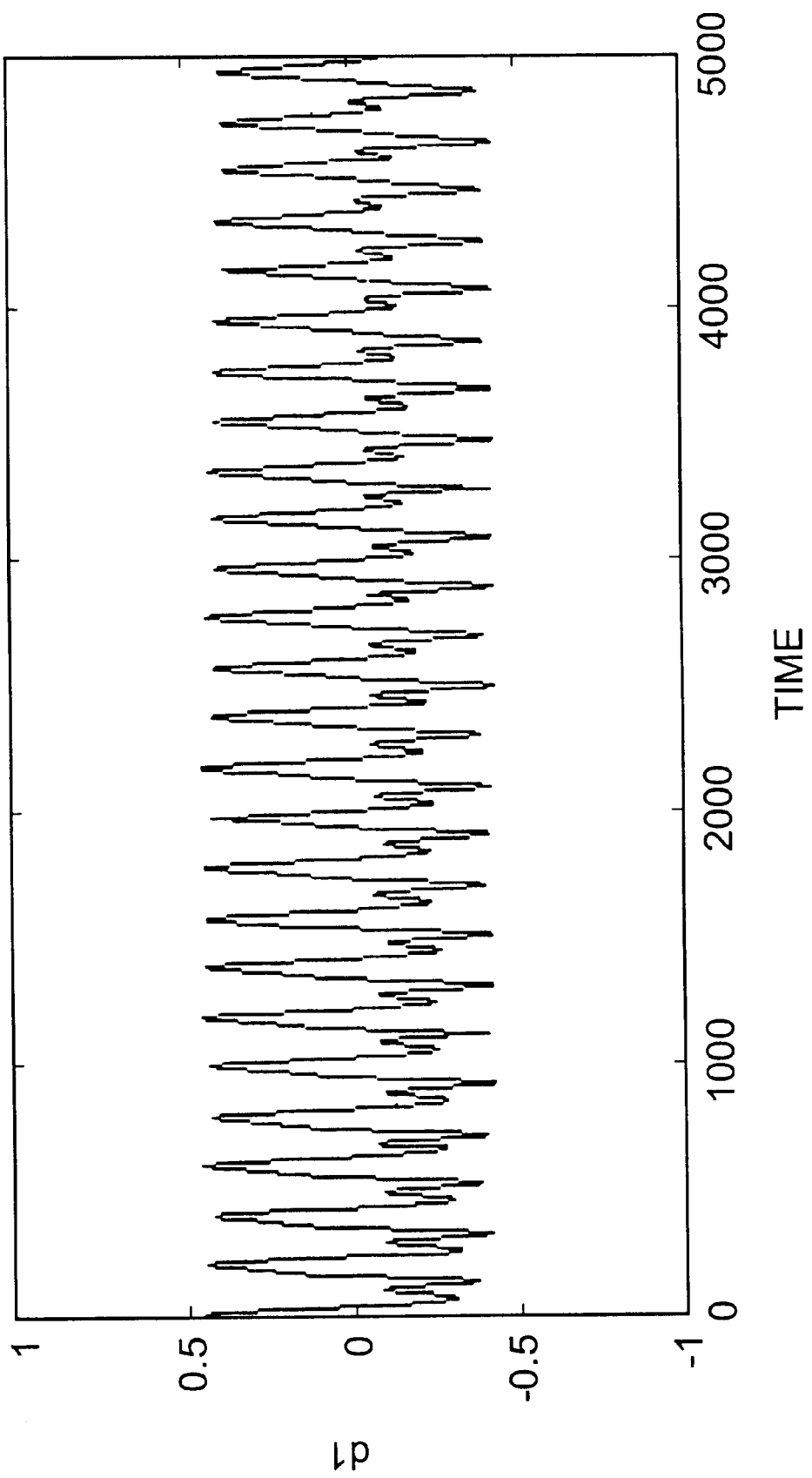
FIGS. 17A–17D are graphs showing measured vibration values of a string.
Figure 17B:
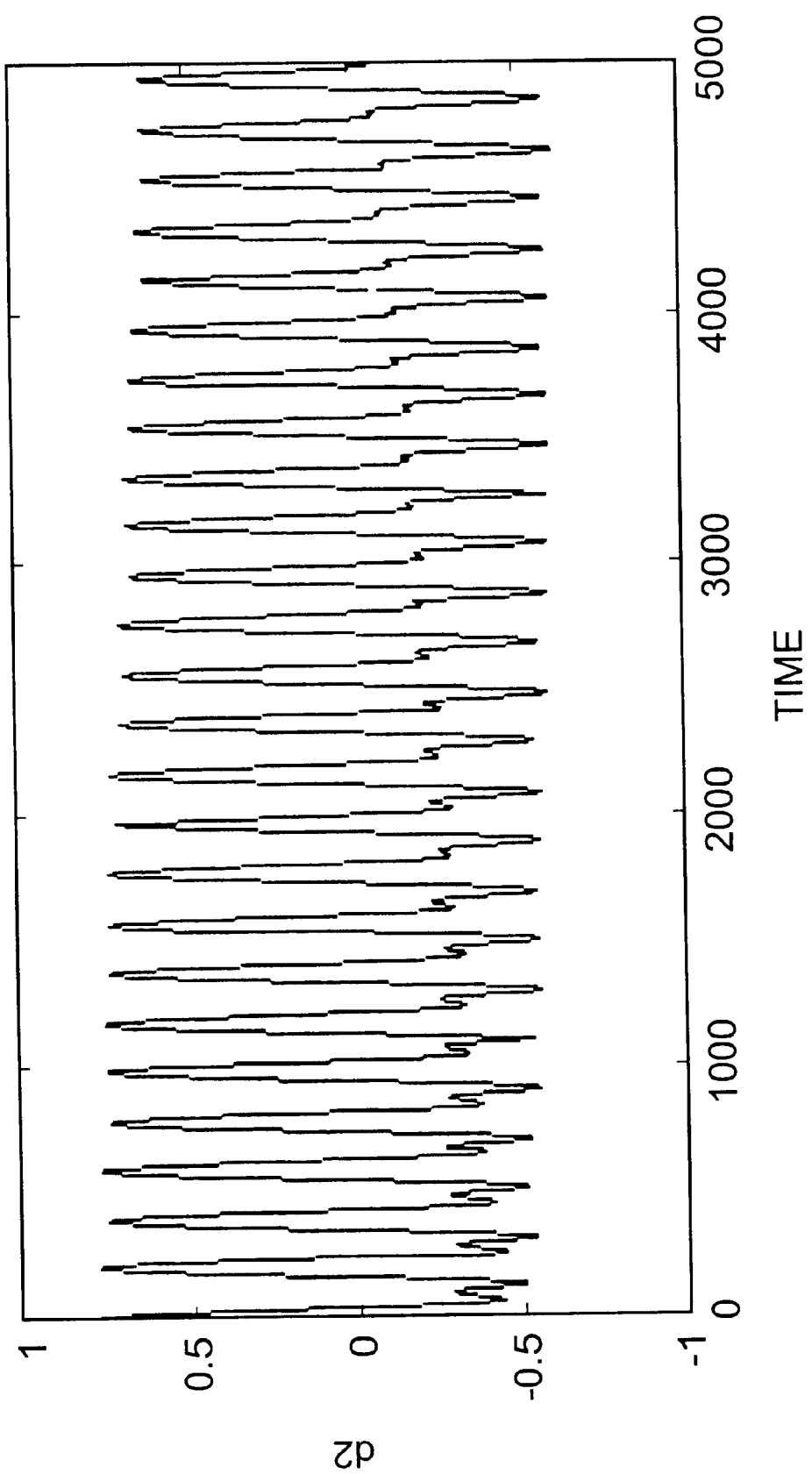
Figure 17C:
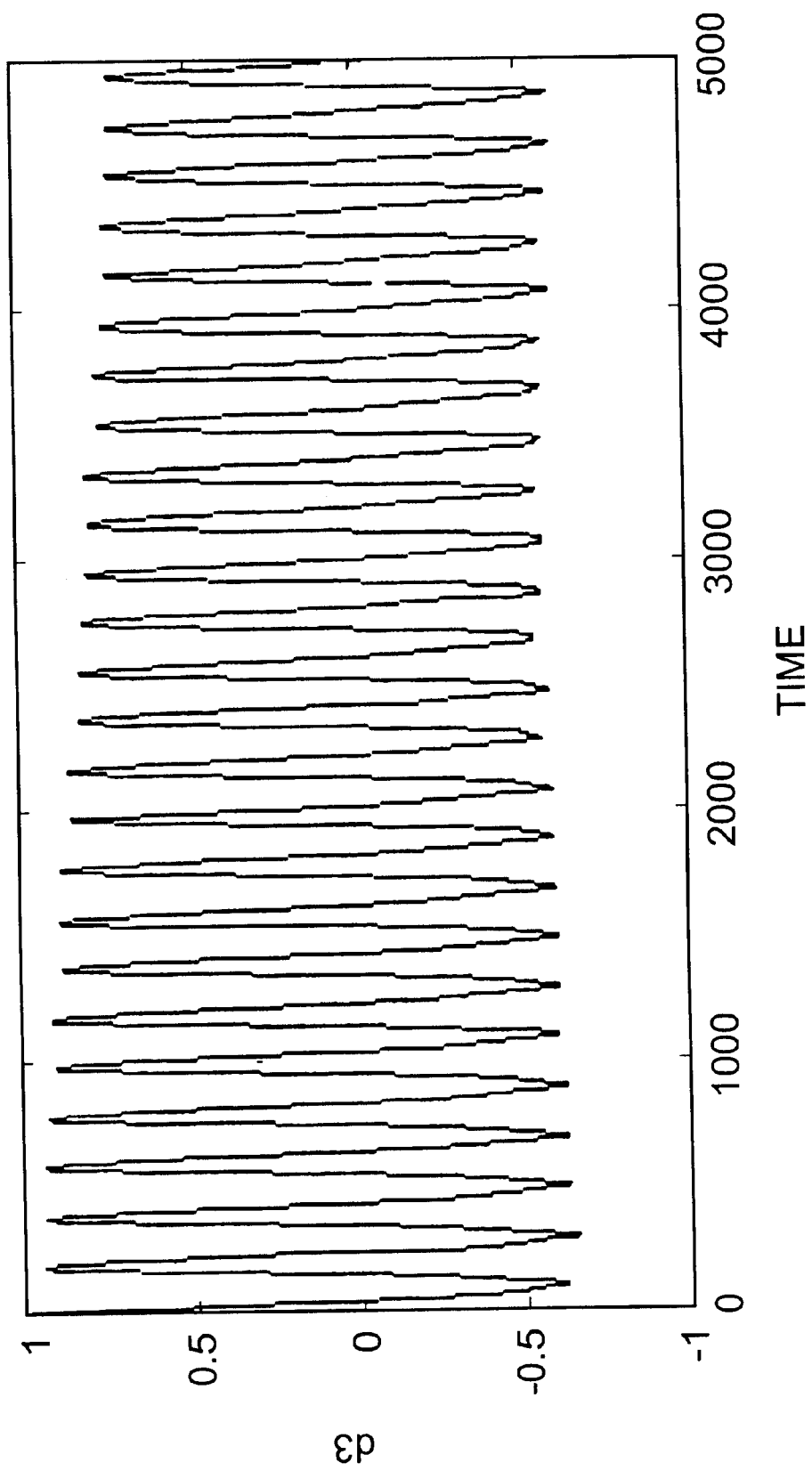
Figure 17D:
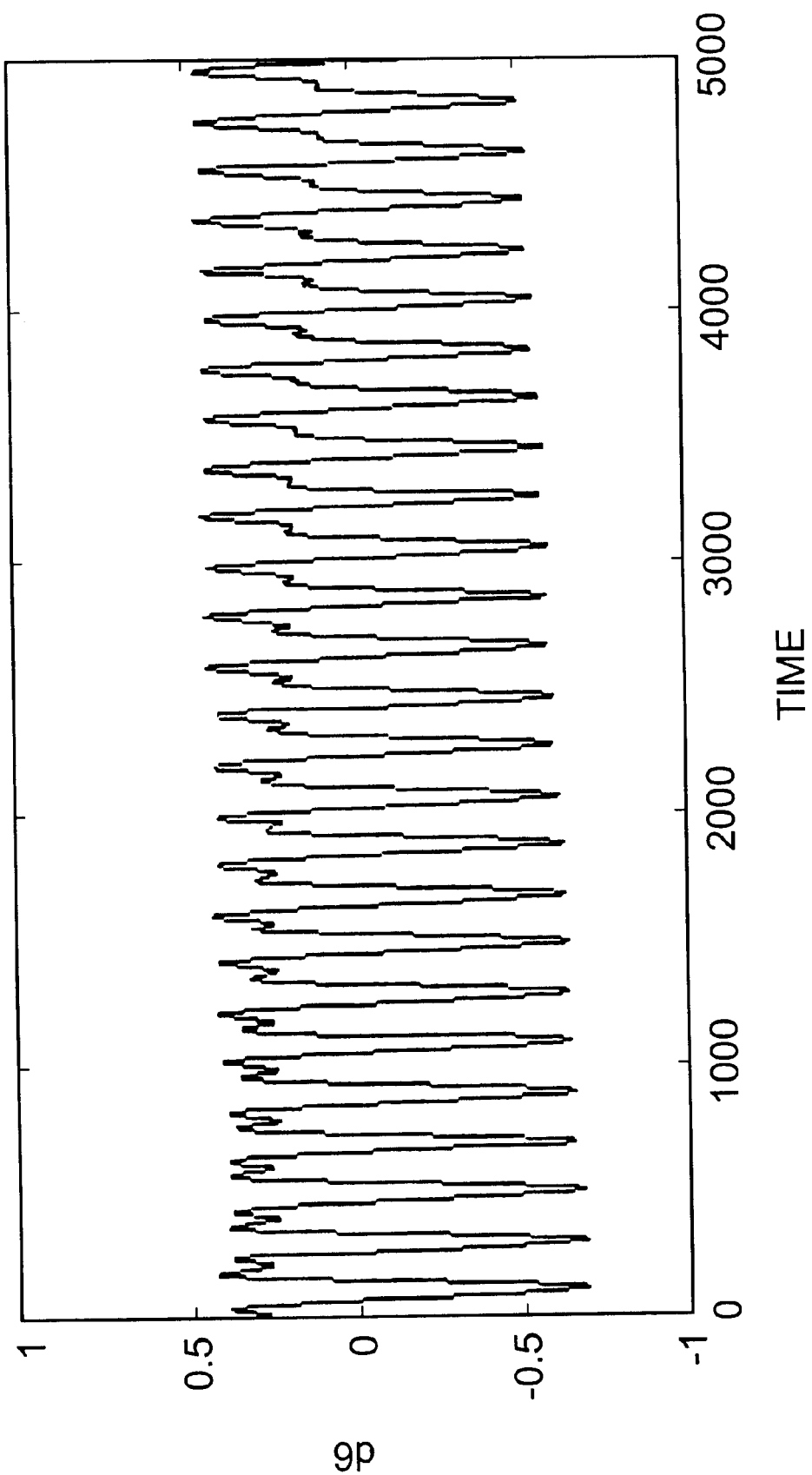
Figure 18A:
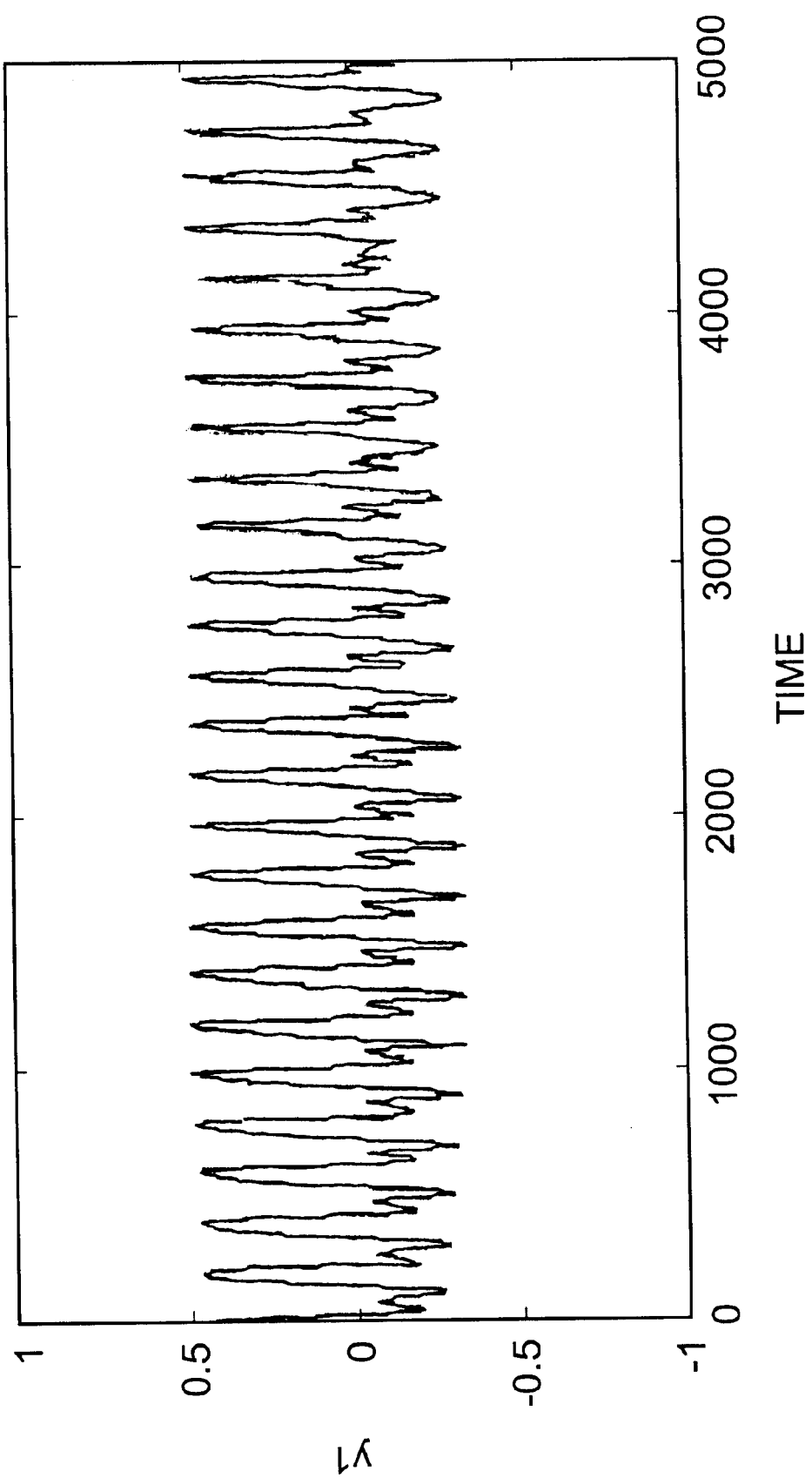
FIGS. 18A–18D are graphs showing vibration values generated through sound synthesis by a trained scattering recurrent network.
Figure 18B:
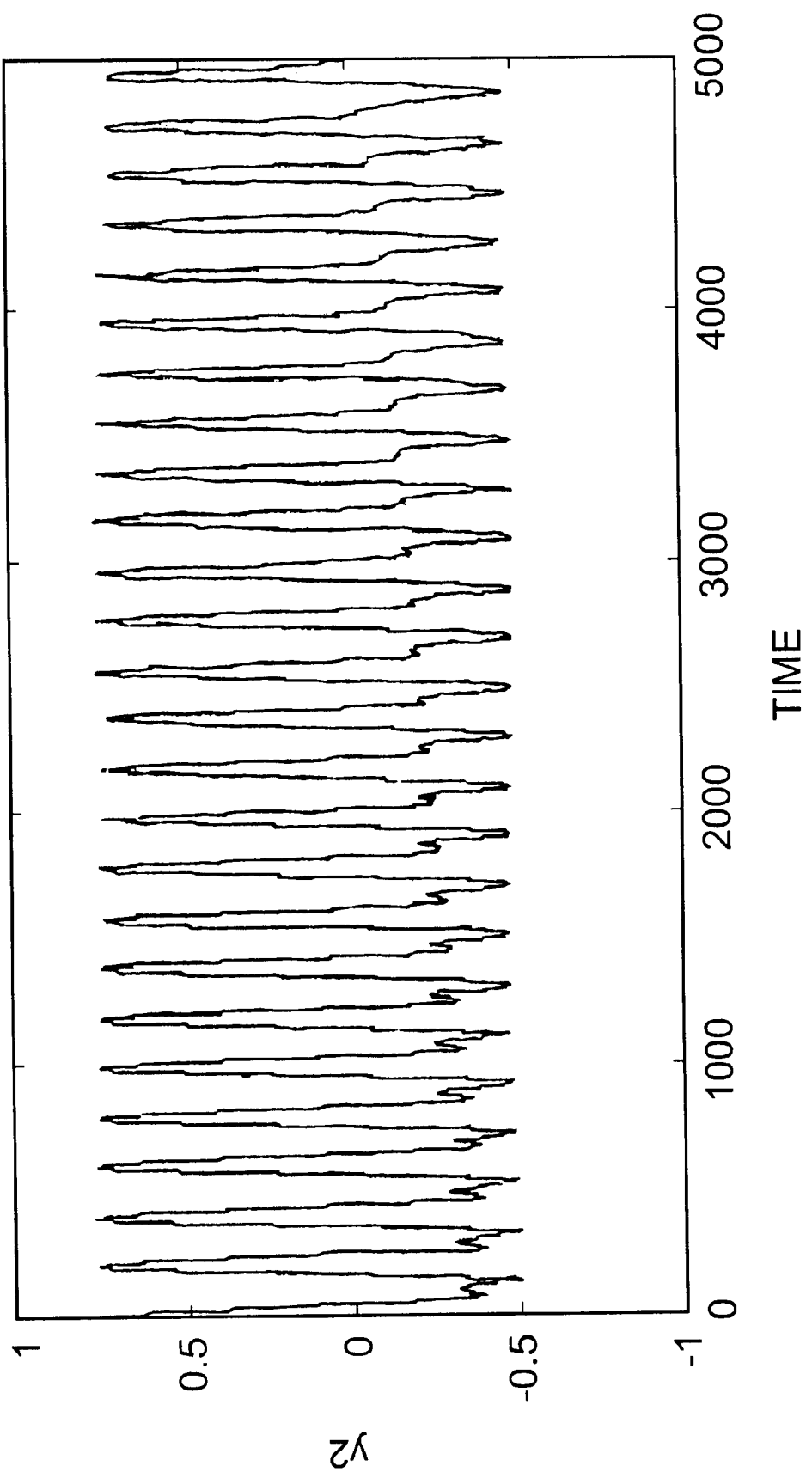
Figure 18C:
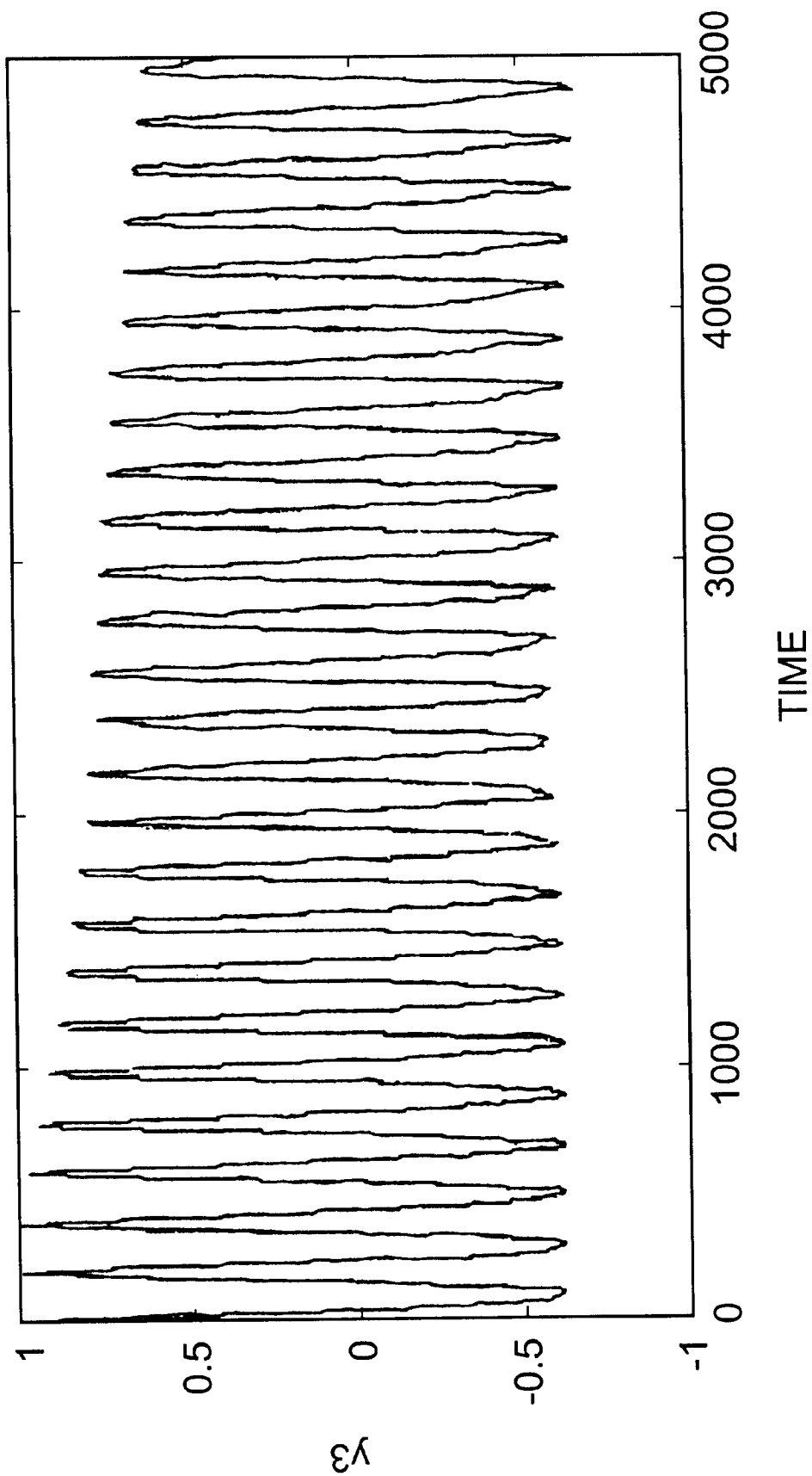
Figure 18D:
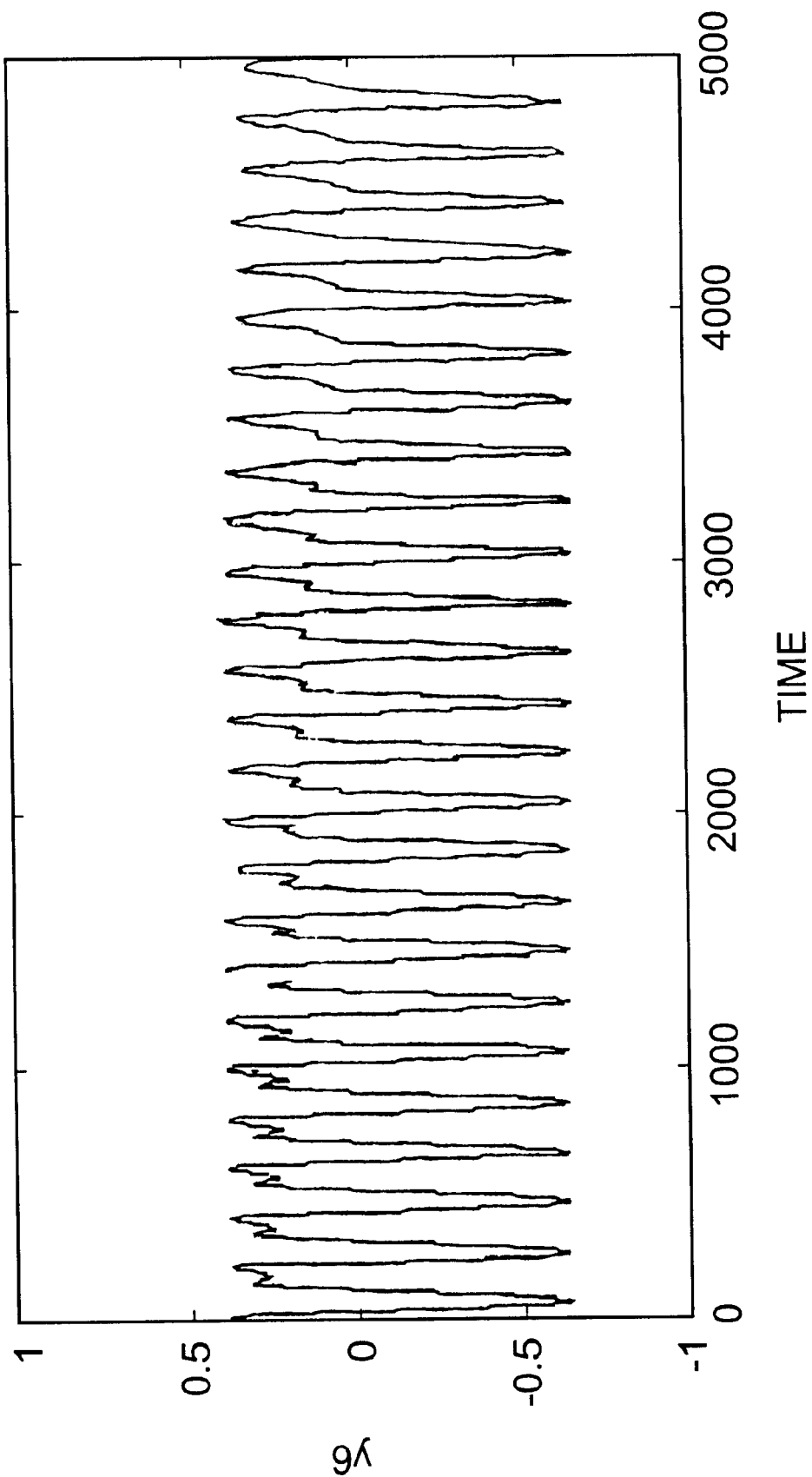
Figure 19A:
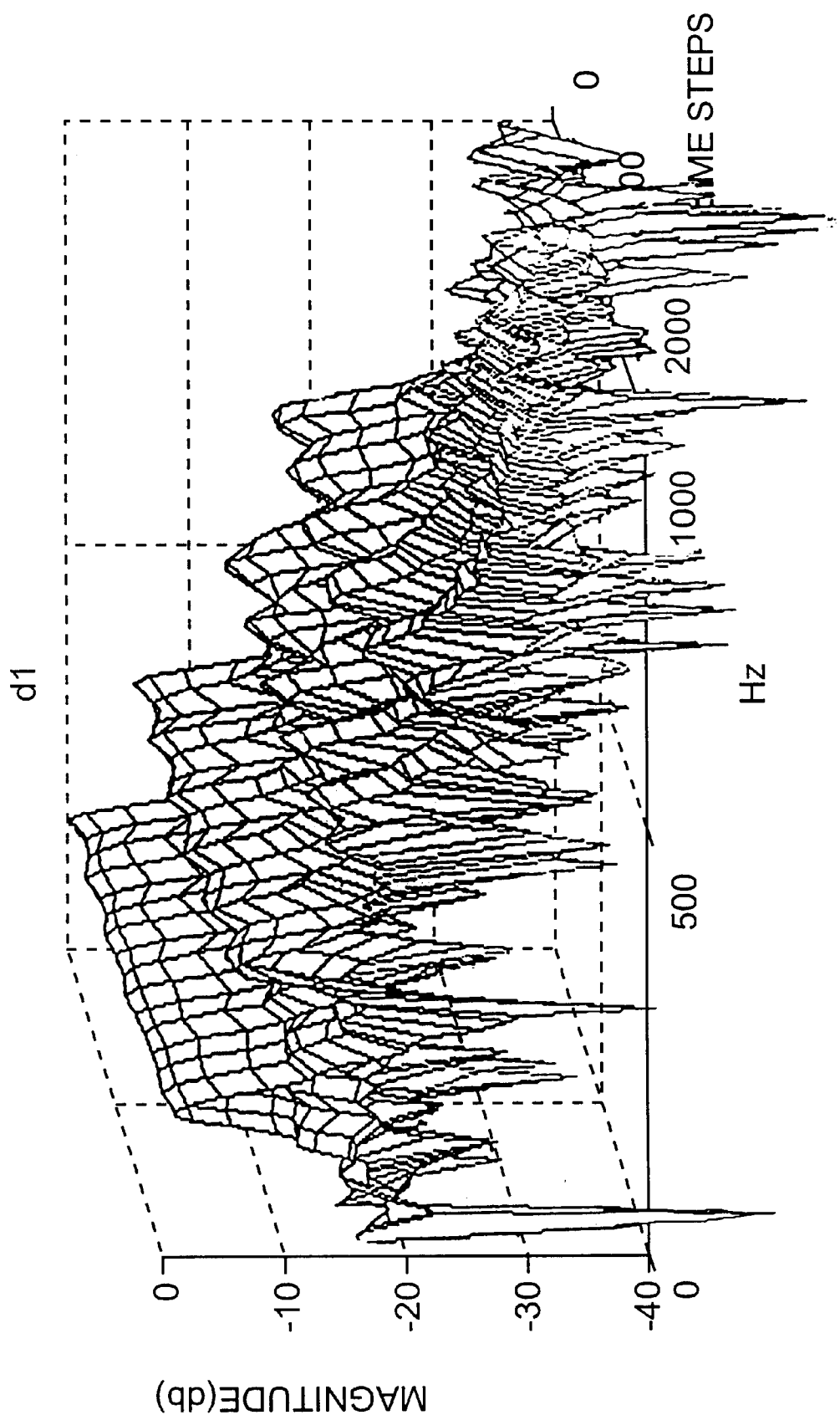
FIGS. 19A–19D are graphs showing the Short-Time-Fourier-Transform of measured vibration values of a string.
Figure 19B:
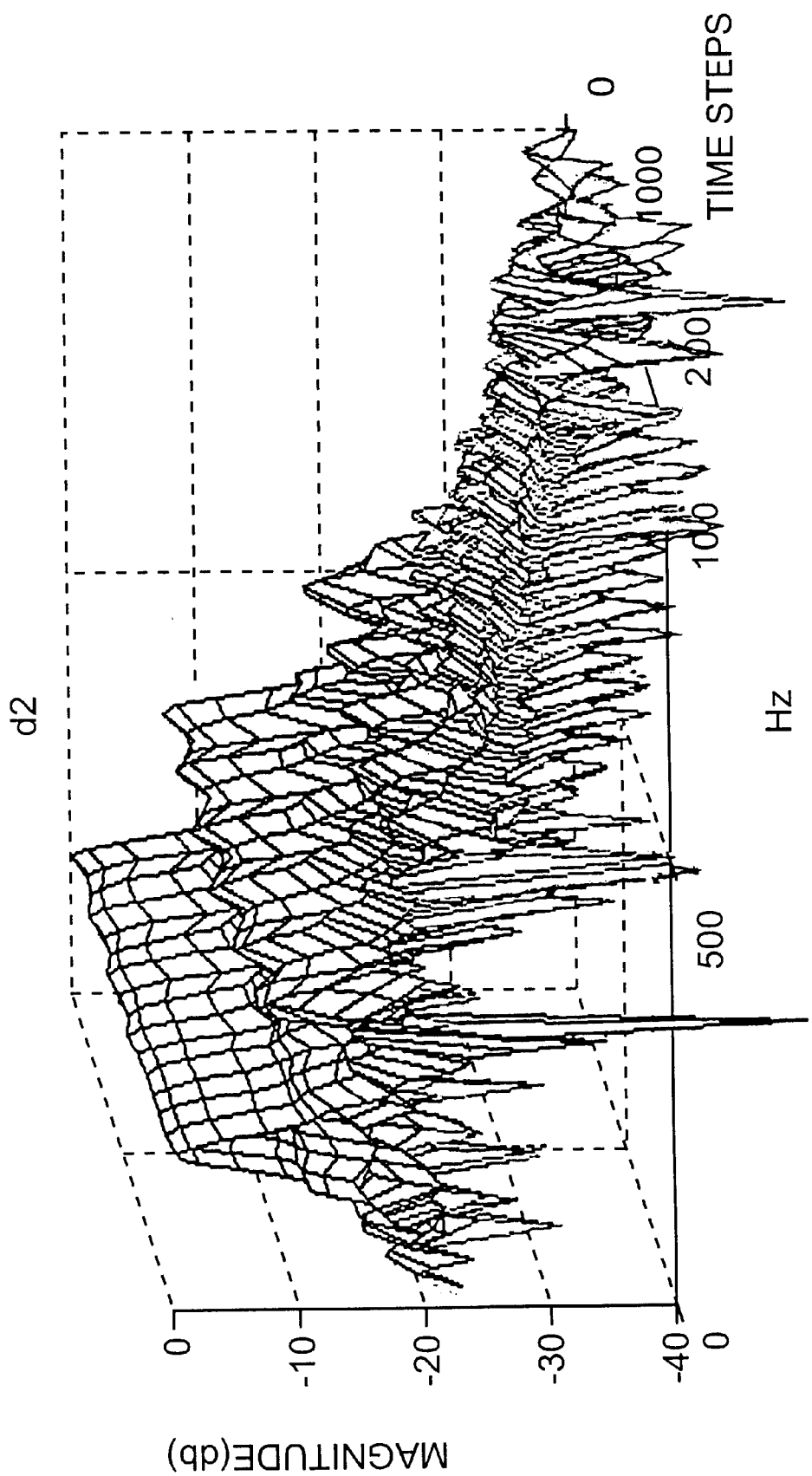
Figure 19C:
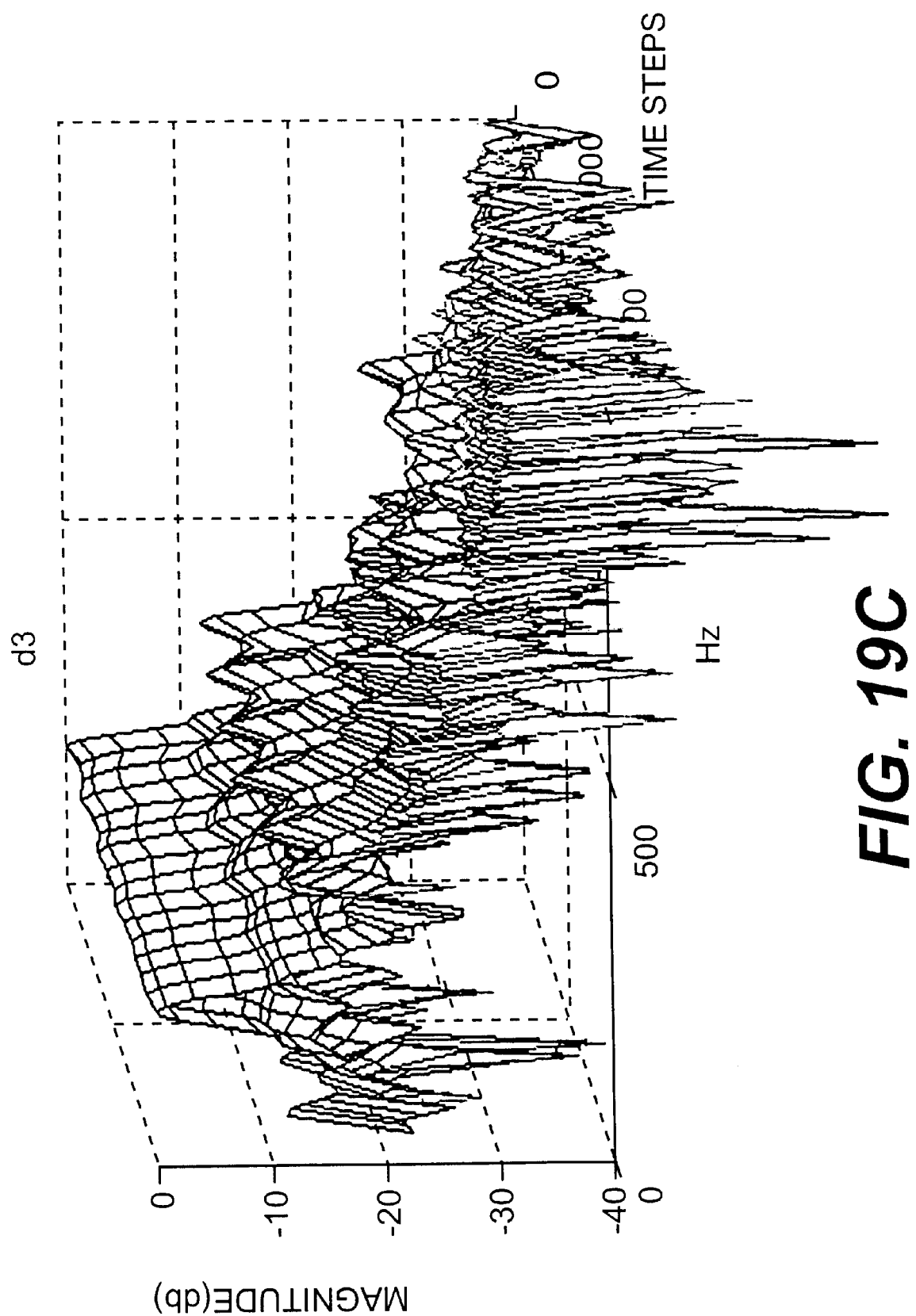
Figure 19D:
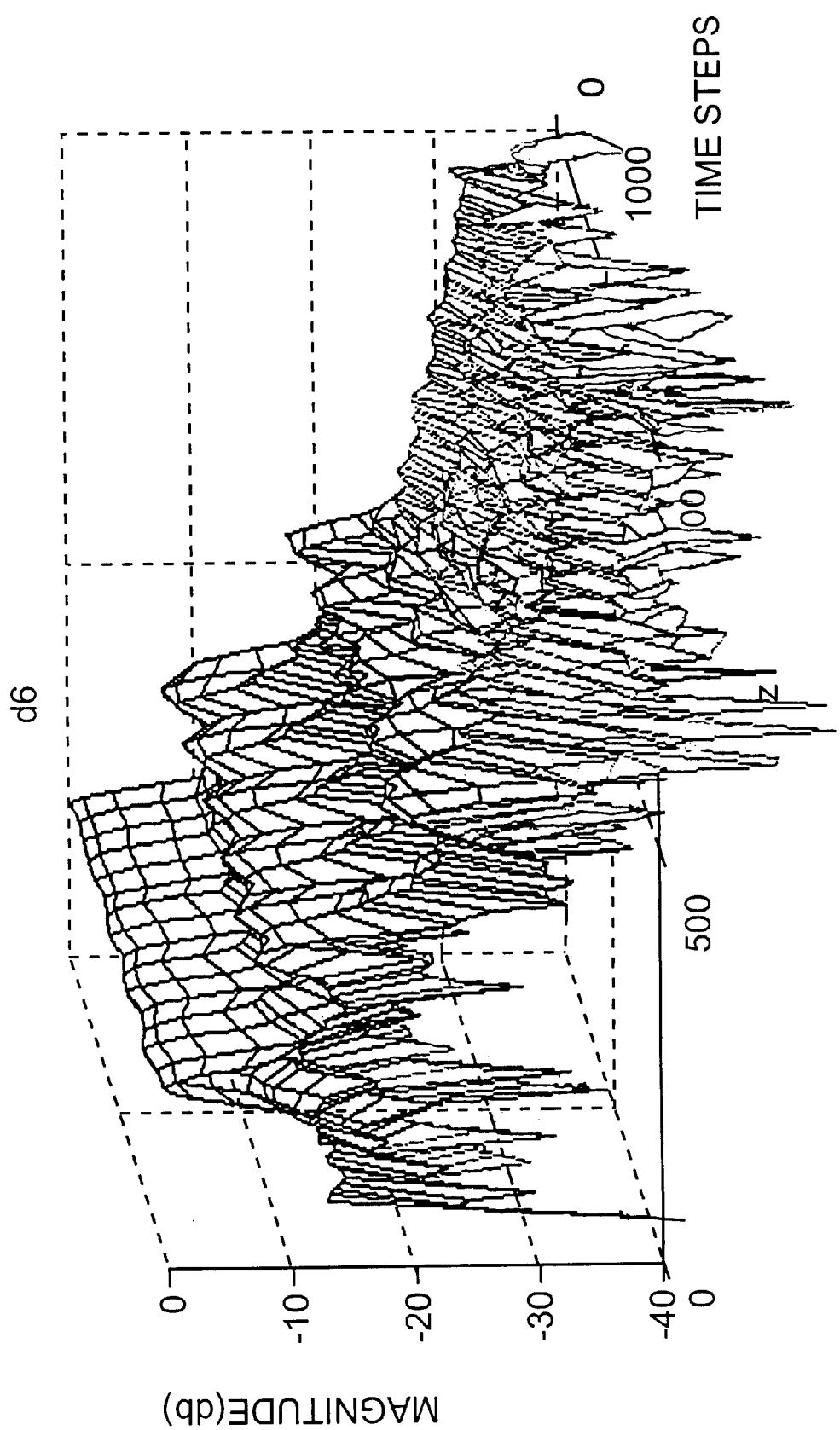
Figure 20A:
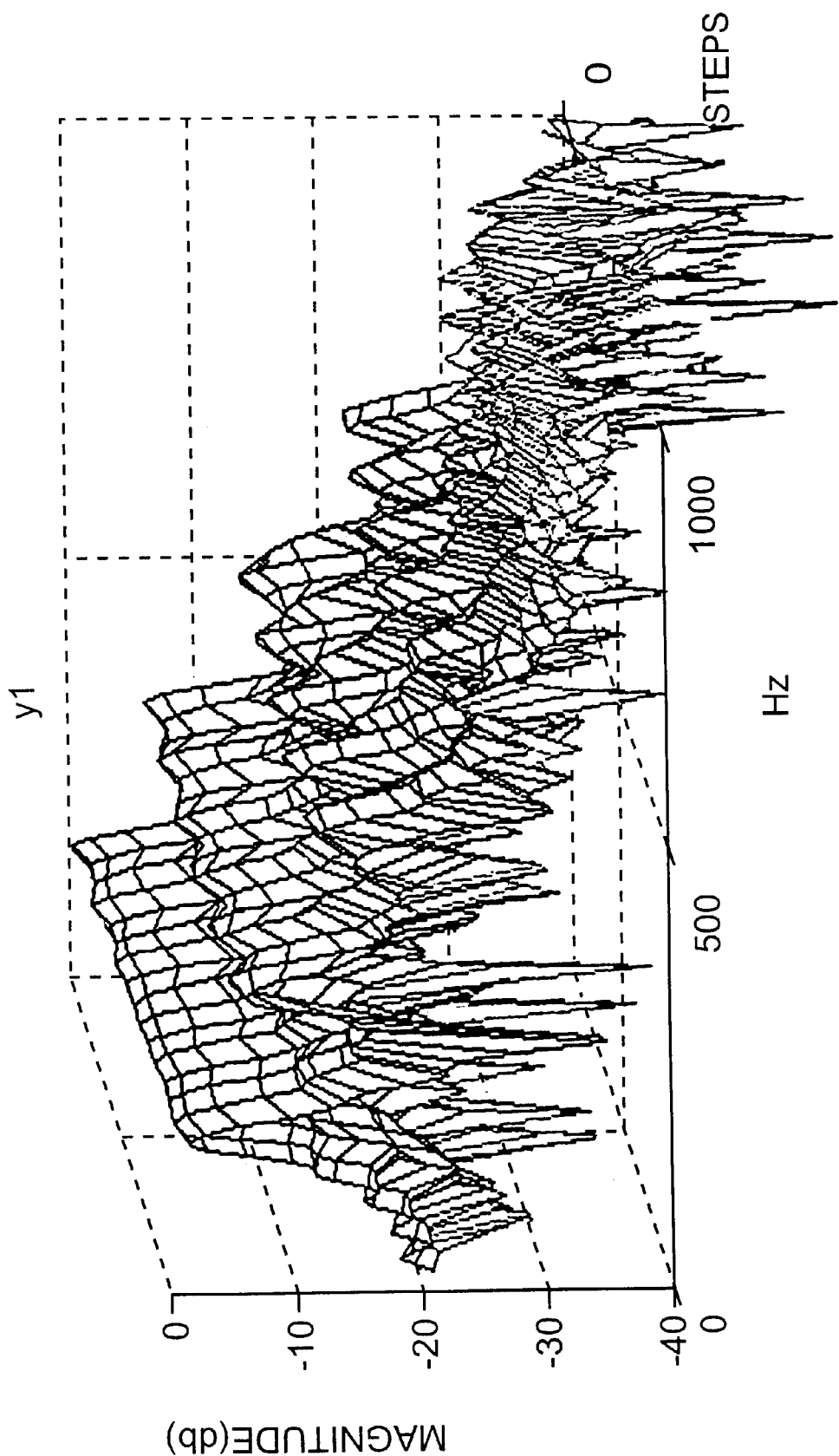
FIGS. 20A–20D are graphs showing the Short-Time-Fourier-Transform of vibration values generated through sound synthesis by a trained scattering recurrent network.
Figure 20B:
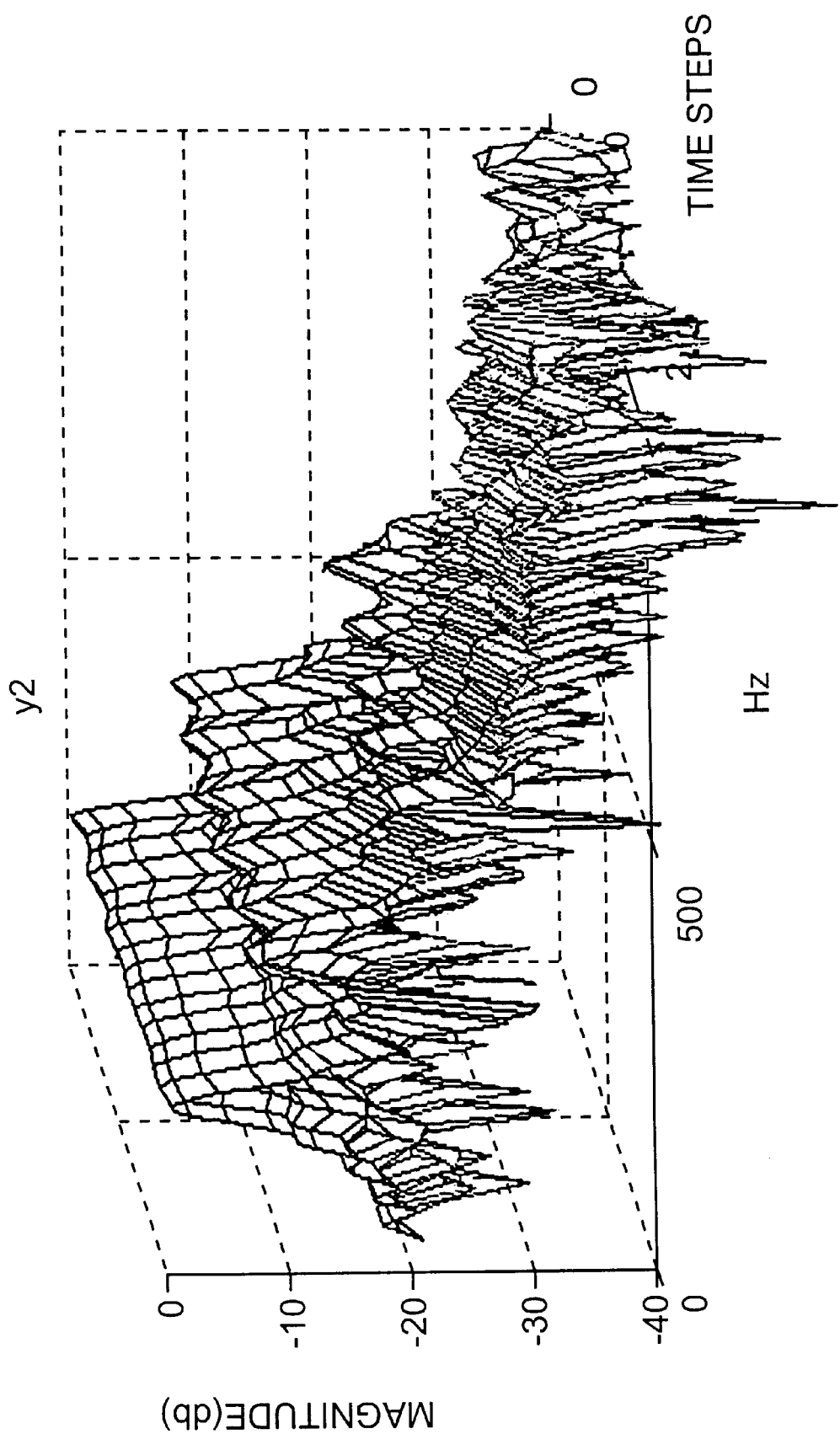
Figure 20C:
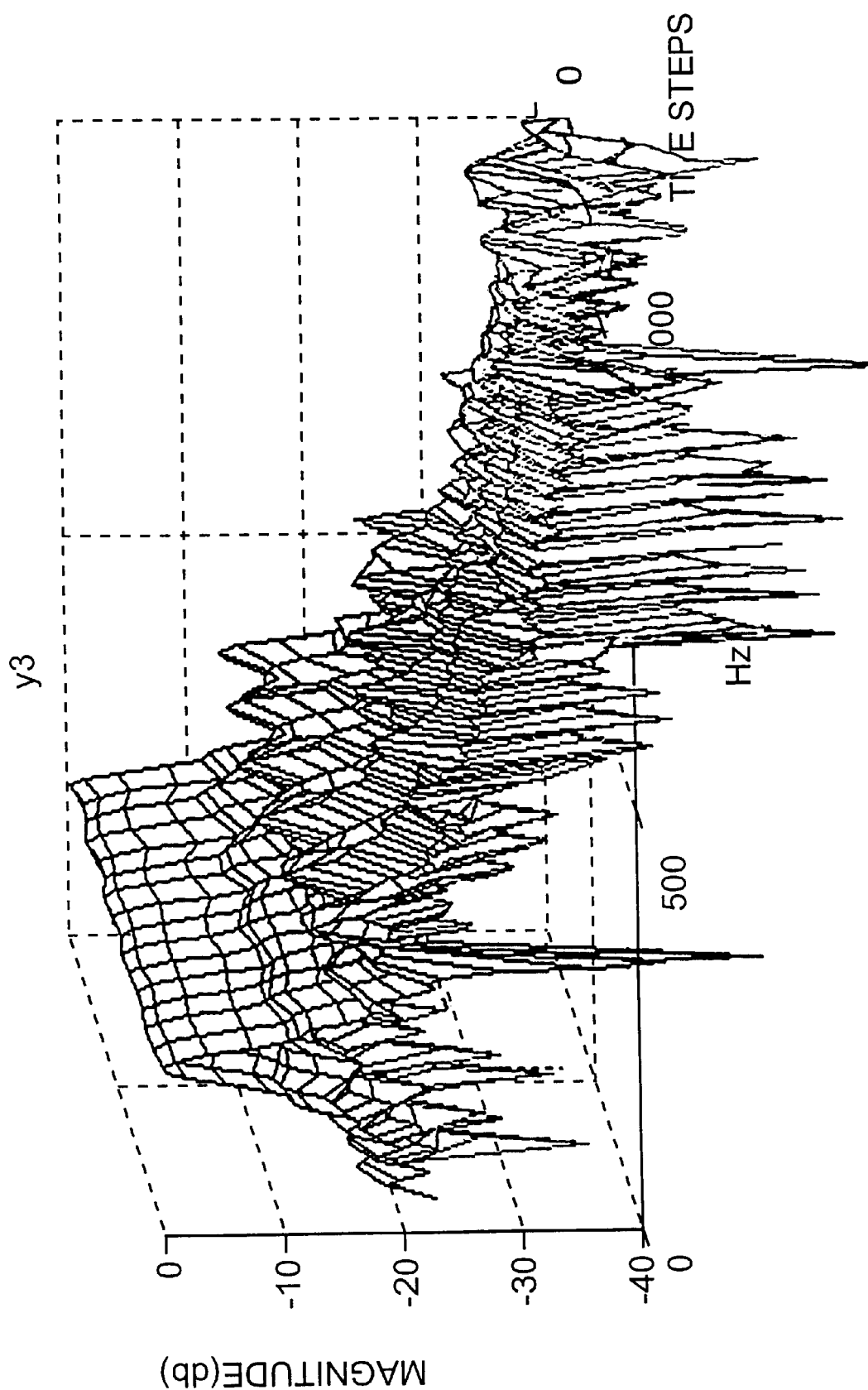
Figure 20D:
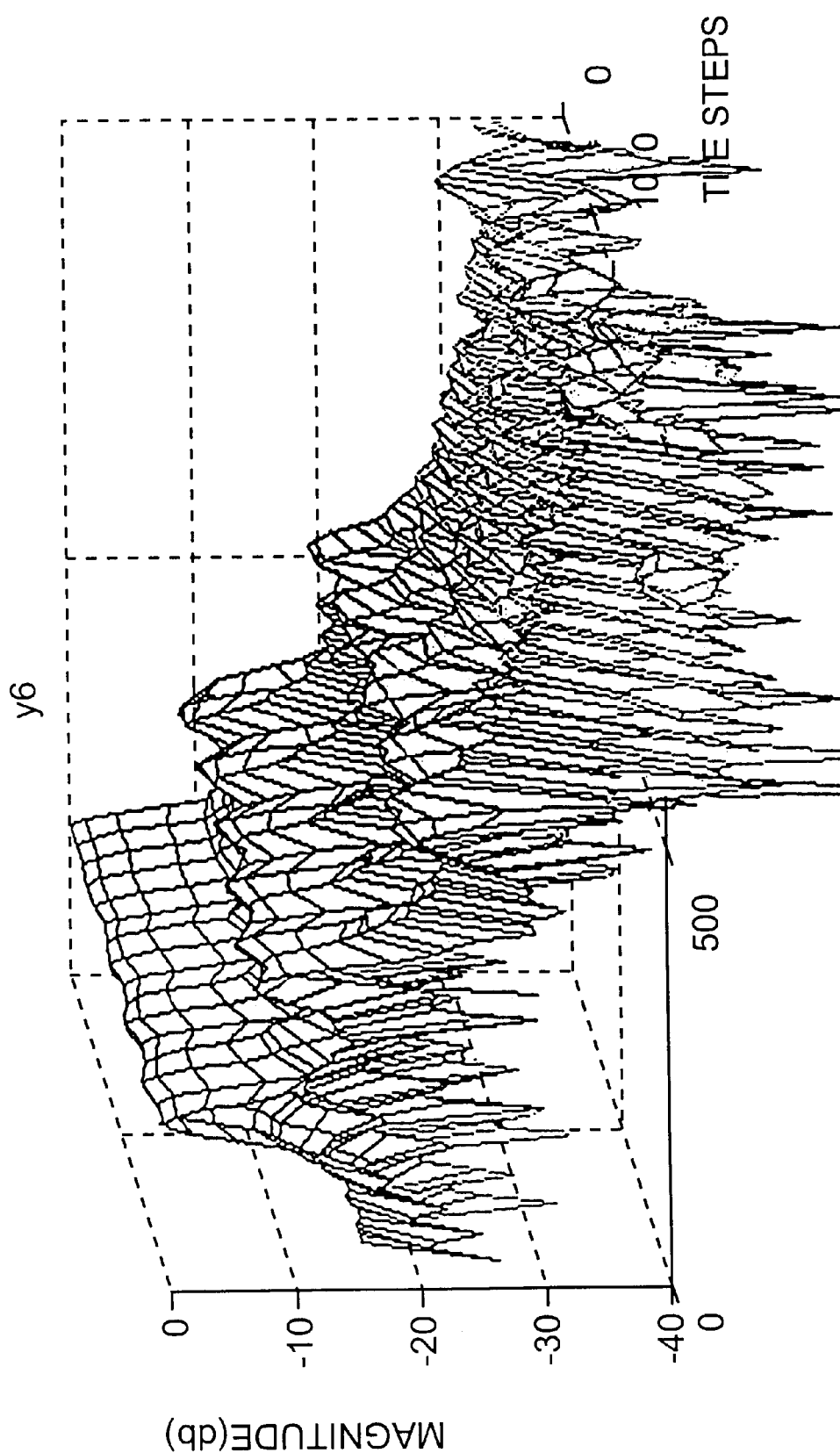

Initial waveforms generated by waveform generation sections 1401 through 1403 are propagated through time by SRN synthesis sections 1405 through 1407, to thereby synthesize sound waveforms. FIG. 16 is a flow chart illustrating methods consistent with the present invention for synthesizing sound. Synthesis involves initializing the network (steps 1601 and 1602) and propagating the node values through time (steps 1603 to 1606).

An initial waveform, such as those illustrated in FIGS. 15A through 15E, can be expressed as $$I=[i_o, i_1, \ldots, i_n]^T \quad (23)$$

The displacement nodes of the SRN at time t=0 are set to the values of the initial waveform, from which the output waveform, out(t), is determined (step 1601). The output waveform, out(t), for any particular time, is the values of the displacement nodes corresponding to the desired output locations. Expressed mathematically, out(t) is $$\text{out}(t)=y_i(t), \forall y_i \in O \quad (24)$$

where O is the set of displacement node values desired in the output signal. The displacement node values obtained in step 1601 are distributed to adjacent departure nodes (step 1602) as $$f_{i+1,i}(0)=f_{i-1,i}(0)=\tfrac{1}{2}y_i(0) \quad (25)$$

thereby completing initialization of the network.

Having filled the departure and displacement initial node values, sound synthesis through the remaining time points is a straightforward application of equations (11), (12), (13), (14) and (24). In particular, having obtained the initial displacement node and departure node values, the SRN synthesis sections use equation (11) to find the arrival node values for time t=1 (step 1603). Equations (12) and (13) are then used to obtain the displacement node values for time t=1, (step 1604), and equation (14) to find the departure node values (step 1605). Output waveform, out(t), is determined at step 1604 using equation (24). Steps 1603 through 1605 are repeated for each of times t=2 to t=end.

Example Simulation

The following example illustrates application of the above discussed principles of the present invention to the A string of a cello.

The training data for the cello's string, shown in FIGS. 17A–17D, was obtained with a measurement device similar to device 1000, but having seven sensors instead of six. FIGS. 17A–17D are graphs showing 10000 sample values measured by four of the seven sensors (sensors 1, 2, 3, and 6).

The first 2000 samples (t=0 to 2000) measured by device 1000 were used to train an SRN having 100 displacement nodes and a learning constant, η, of 0.0000001. The network was trained for 10,000 epochs.

FIGS. 18A–18D are graphs showing values generated through sound synthesis by the trained SRN at each of the four visible displacement nodes. The initial waveform used to stimulate the SRN was designed to resemble the plucking motion used to generate the values shown in FIGS. 17A–17D. As can be seen from a comparison of FIGS. 17A–17D to FIGS. 18A–18D, the synthesized waveform is similar to the waveform measured from the physically plucked cello string.

FIGS. 19A–19D are waveforms illustrating the Short-Time-Fourier-Transform (STFT) of the waveforms of FIGS. 17A–17D, respectively. Similarly, FIGS. 20A–20D are waveforms illustrating the Short-Time-Fourier-Transform (STFT) of the waveforms of FIGS. 18A–18D, respectively. The STFT waveforms more readily illustrate the frequency components present in the waveforms of FIGS. 17 and 18.

It will be apparent to those skilled in the art that various modifications and variations can be made to the present invention without departing from the scope or spirit of the invention. For example, although the embodiments disclosed herein describe a neural network trained and implemented on a multimedia computer, the networks could, of course, be implemented via dedicated hardware.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of synthesizing sounds produced by a plucked string comprising the steps of:

generating an input waveform corresponding to an initial plucking of the string, wherein waveform values are assigned to a plurality of predetermined points on the string and interpolating further waveform values based on the assigned values;

initializing nodes of a neural network with values based on the input waveform;

iteratively changing the node values based on weights associated with the nodes;

outputting a waveform based on selected ones of the node values at a plurality of the iterations; and generating sound based on a sequence of the output waveforms, the generated sound simulating the sound made by the plucked string.

2. The method of claim 1, wherein the step of generating the input waveform further includes the sub-step of assigning waveform values to a plurality of predetermined points on the string based on a mathematical function.

3. The method of claim 1, wherein the step of initializing the neural network further includes the sub-step of setting displacement nodes of the neural network to values of the input waveform.

4. The method of claim 1, wherein the neural network is a recurrent neural network.

5. The method of claim 1, wherein the step of iteratively changing the node values further includes, for each iteration, the sub-steps of:

calculating values of arrival nodes in the neural network based on values of departure nodes in the neural network at a previous iteration;

calculating values of displacement nodes in the neural network based on the calculated values of the arrival nodes; and calculating values of the departure nodes in the neural network based on the calculated values of the displacement nodes and arrival nodes.

6. The method of claim 5, wherein the sub-step of calculating the values of the arrival nodes in the neural network further includes the step of evaluating the equation:

$$\begin{cases} \varphi_{i,i-1}(t+1) = a[net^{\varphi}_{i,i-1}(t)] = a[w_{i,i-1} \cdot f_{i,i-1}(t)] \\ \varphi_{i,i+1}(t+1) = a[net^{\varphi}_{i,i+1}(t)] = a[w_{i,i+1} \cdot f_{i,i+1}(t)] \end{cases}.$$

7. The method of claim 5, wherein the sub-step of calculating the values of the displacement nodes in the neural network further includes the step of evaluating the equations:

$$y_i(t+1) = \begin{cases} a[net^y_i(t+1)], & i = 2, \ldots, N-1 \\ 0, & i = 1 \text{ or } i = N \end{cases}$$

$$net_i^y(t+1) = r_{i,i-1} \cdot \varphi_{i,i-1}(t+1) + r_{i,i+1} \cdot \varphi_{i,i+1}(t+1).$$

8. The method of claim 5, wherein the sub-step of calculating the values of the departure nodes in the neural network further includes the step of evaluating the equation:

$$\begin{cases} f_{i+1,i}(t+1) = a[net^f_{i+1,i}(t+1)] = a[y_i(t+1) - \varphi_{i,i+1}(t+1)] \\ f_{i-1,i}(t+1) = a[net^f_{i-1,i}(t+1)] = a[y_i(t+1) - \varphi_{i,i-1}(t+1)] \end{cases}.$$

9. A computer readable medium containing instructions for execution on a computer that synthesizes sounds produced by a plucked string, the instructions, when executed, causing the computer to perform the steps of:

generating an input waveform corresponding to an initial plucking of the string, wherein waveform values are assigned to a plurality of predetermined points on the string and interpolating further waveform values based on the assigned values;

initializing nodes of a neural network with values based on the input waveform;

iteratively changing the node values based on weights associated with the nodes;

outputting a waveform based on selected ones of the node values at a plurality of the iterations; and generating sound based on a sequence of the output waveforms, the generated sound simulating the sound made by the plucked string.

* * * * *

UNITED STATES PATENT AND TRADEMARK OFFICE
CERTIFICATE OF CORRECTION

| | |
|---|---|
| PATENT NO. | : 6,292,791 B1 |
| DATED | : September 18, 2001 |
| INVENTOR(S) | : Wen-Yu SU et al. |

It is certified that error appears in the above-identified patent and that said Letters Patent is hereby corrected as shown below:

<u>Column 14,</u>
Line 16, "$net_i^y(t+1) = r_{i,i-1} \cdot \phi_{i,i-1}(t+1) + r_{i,i-1} \cdot \phi_{i,i+1}(t+1)$" should read
-- $net_i^y(t+1) = r_{i,i-1} \cdot \varphi_{i,i-1}(t+1) + r_{i,i-1} \cdot \varphi_{i,i+1}(t+1)$ --.

Signed and Sealed this

Twenty-third Day of April, 2002

Attest:

*Attesting Officer*

JAMES E. ROGAN
*Director of the United States Patent and Trademark Office*